(12) United States Patent
Suzuki

(10) Patent No.: US 10,070,107 B2
(45) Date of Patent: Sep. 4, 2018

(54) IMAGE PICKUP UNIT FOR CONCURRENTLY SHOOTING AN OBJECT AND PROJECTING ITS IMAGE

(71) Applicant: SONY CORPORATION, Tokyo (JP)

(72) Inventor: Takumi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/307,361

(22) PCT Filed: Apr. 9, 2015

(86) PCT No.: PCT/JP2015/001992
§ 371 (c)(1),
(2) Date: Oct. 27, 2016

(87) PCT Pub. No.: WO2015/170442
PCT Pub. Date: Nov. 12, 2015

(65) Prior Publication Data
US 2017/0048504 A1    Feb. 16, 2017

(30) Foreign Application Priority Data

May 9, 2014 (JP) ................................. 2014-097847

(51) Int. Cl.
| H04N 9/31 | (2006.01) |
| H04N 5/225 | (2006.01) |
| H04N 5/232 | (2006.01) |
| H04N 5/369 | (2011.01) |

(52) U.S. Cl.
CPC ......... *H04N 9/3176* (2013.01); *H04N 5/2251* (2013.01); *H04N 5/2252* (2013.01); *H04N 5/2254* (2013.01); *H04N 5/2256* (2013.01); *H04N 5/23238* (2013.01); *H04N 5/369* (2013.01)

(58) Field of Classification Search
CPC .. H04N 5/2251; H04N 5/2252; H04N 5/2254; H04N 5/2256; H04N 5/23238
See application file for complete search history.

(56) References Cited

U.S. PATENT DOCUMENTS

| 5,561,526 A * | 10/1996 | Huber ................ | G01B 11/2504 348/E13.005 |
| 6,542,249 B1 * | 4/2003 | Kofman ............. | G01B 11/2513 356/601 |
| 8,082,120 B2 * | 12/2011 | St-Pierre ................ | G01C 11/02 356/601 |
| 8,284,240 B2 * | 10/2012 | Saint-Pierre ........... | G01B 11/03 348/42 |

(Continued)

FOREIGN PATENT DOCUMENTS

| DE | 19733267 A1 * | 2/1999 | ............ G03B 19/04 |
| EP | 1901548 A2 | 3/2008 | |
| JP | 2006-308995 A | 11/2006 | |

OTHER PUBLICATIONS

International Search Report and Written Opinion of PCT Application No. PCT/JP2015/001992, dated Jul. 8, 2015, 08 pages of ISRWO.

*Primary Examiner* — Amy Hsu
(74) *Attorney, Agent, or Firm* — Chip Law Group

(57) ABSTRACT

An image pickup unit includes: a main body including a lens and an image pickup device; and a grip mounted on the main body and including a projector.

7 Claims, 24 Drawing Sheets

(56) References Cited

U.S. PATENT DOCUMENTS

| | | | |
|---|---|---|---|
| 8,294,958 B2* | 10/2012 | Paterson | G01B 11/2518 358/1.9 |
| 8,687,113 B2* | 4/2014 | Yano | H04N 5/2251 348/375 |
| 9,599,455 B2* | 3/2017 | Heidemann | G01B 11/2513 |
| 9,607,239 B2* | 3/2017 | Bridges | G06K 9/4604 |
| 2008/0068495 A1* | 3/2008 | Bacani | H04N 5/225 348/375 |
| 2008/0218613 A1* | 9/2008 | Janson | G03B 15/00 348/262 |
| 2010/0134598 A1* | 6/2010 | St-Pierre | G01B 11/2513 348/47 |
| 2010/0238345 A1* | 9/2010 | Greb | F16M 11/125 348/373 |
| 2011/0109784 A1* | 5/2011 | Akiyama | H04N 5/23293 348/333.06 |
| 2014/0028805 A1* | 1/2014 | Tohme | G01C 15/002 348/47 |
| 2014/0152769 A1* | 6/2014 | Atwell | G01B 11/2513 348/46 |
| 2014/0168379 A1* | 6/2014 | Heidemann | G01B 11/2513 348/47 |

* cited by examiner

[FIG. 1]
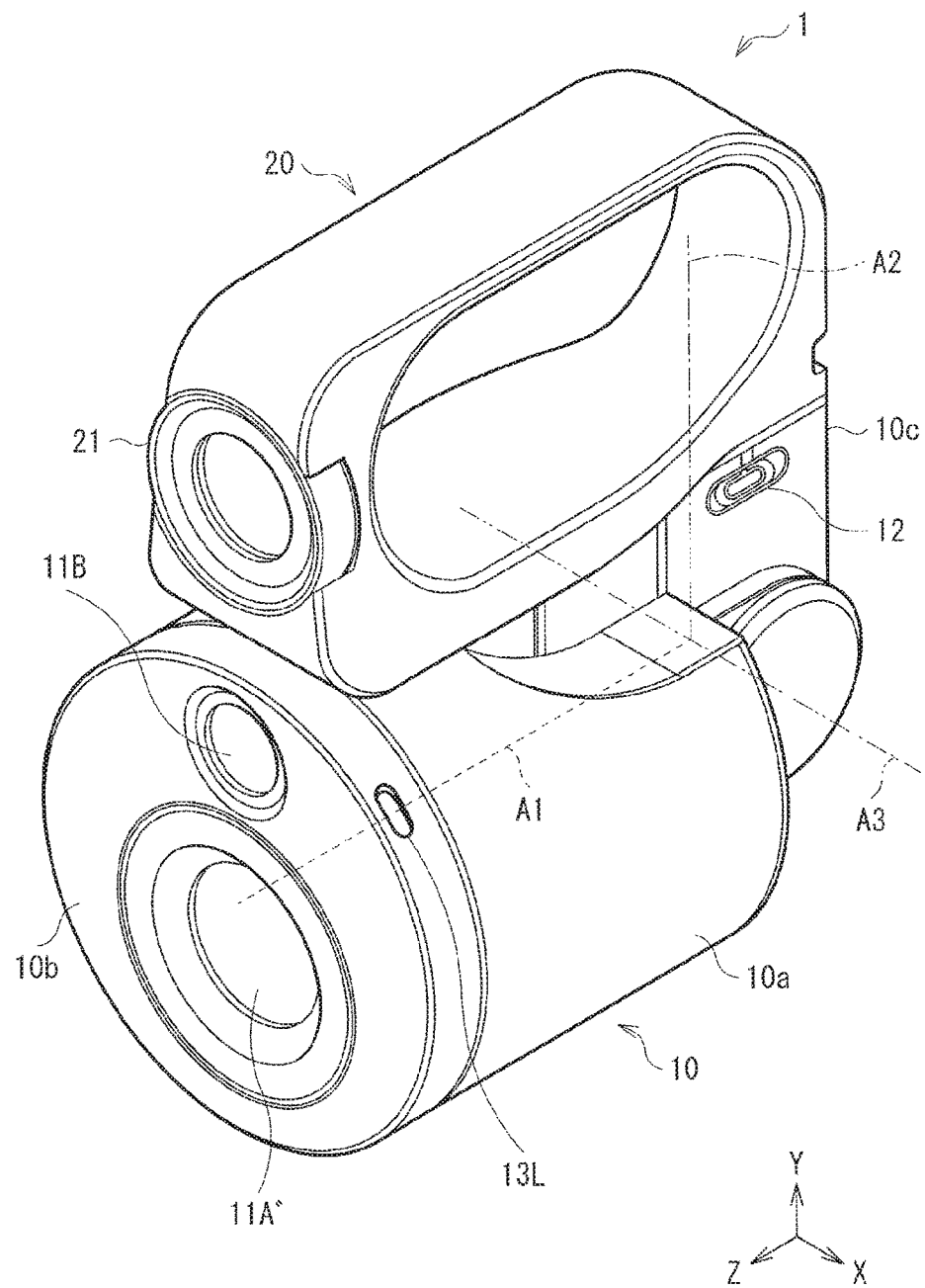

[FIG. 2]
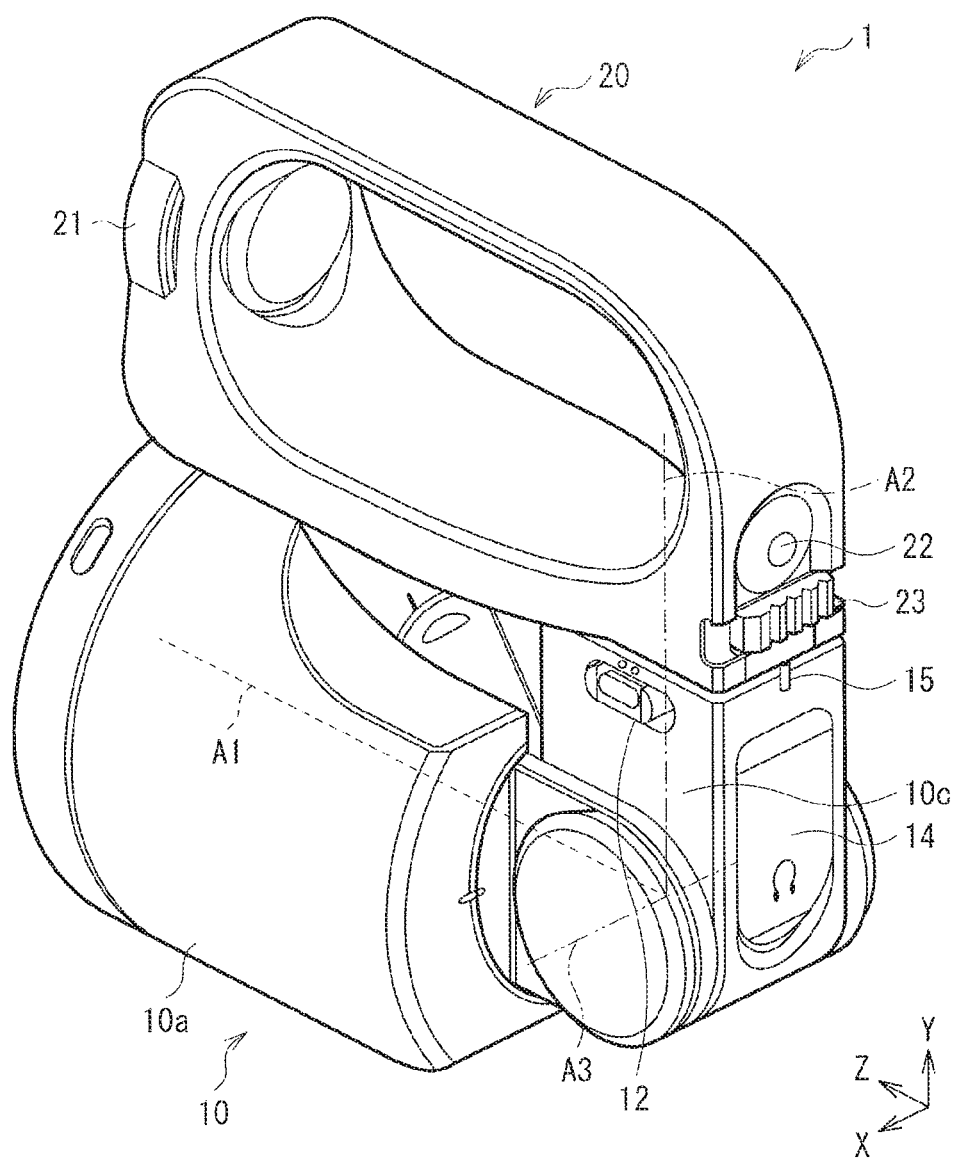

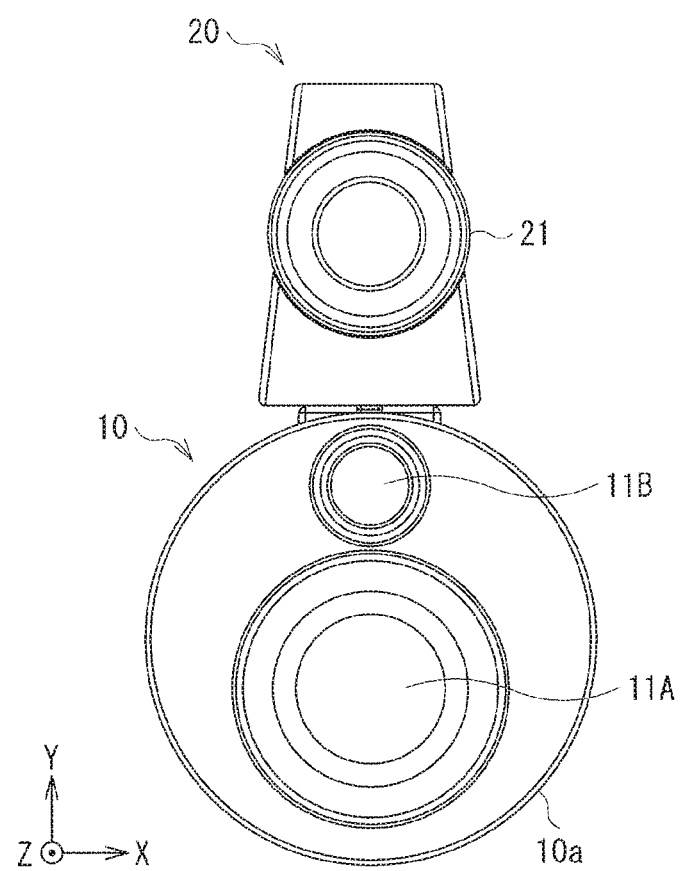
[ FIG. 3A ]

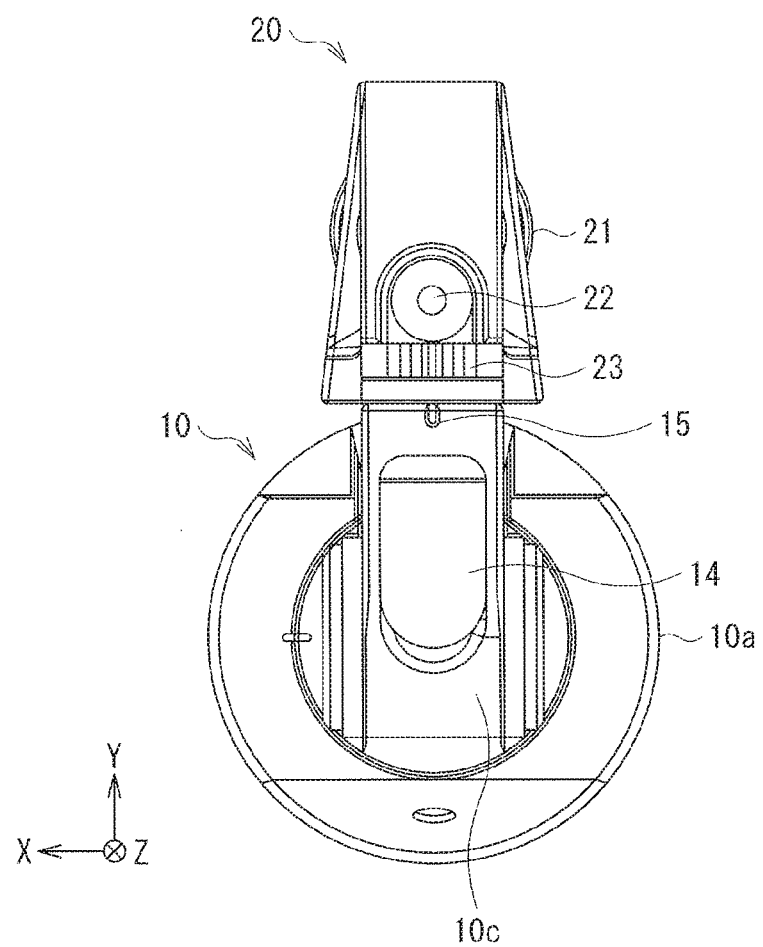
[FIG. 3B]

[ FIG. 4A ]
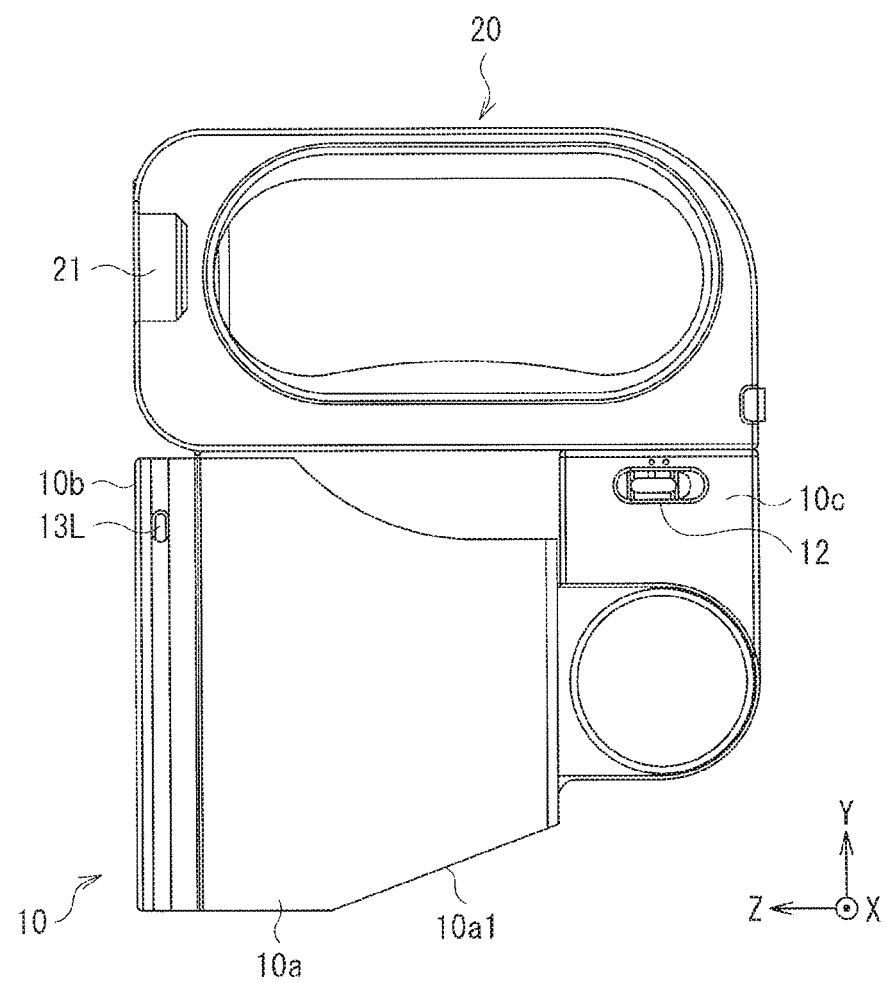

[ FIG. 4B ]
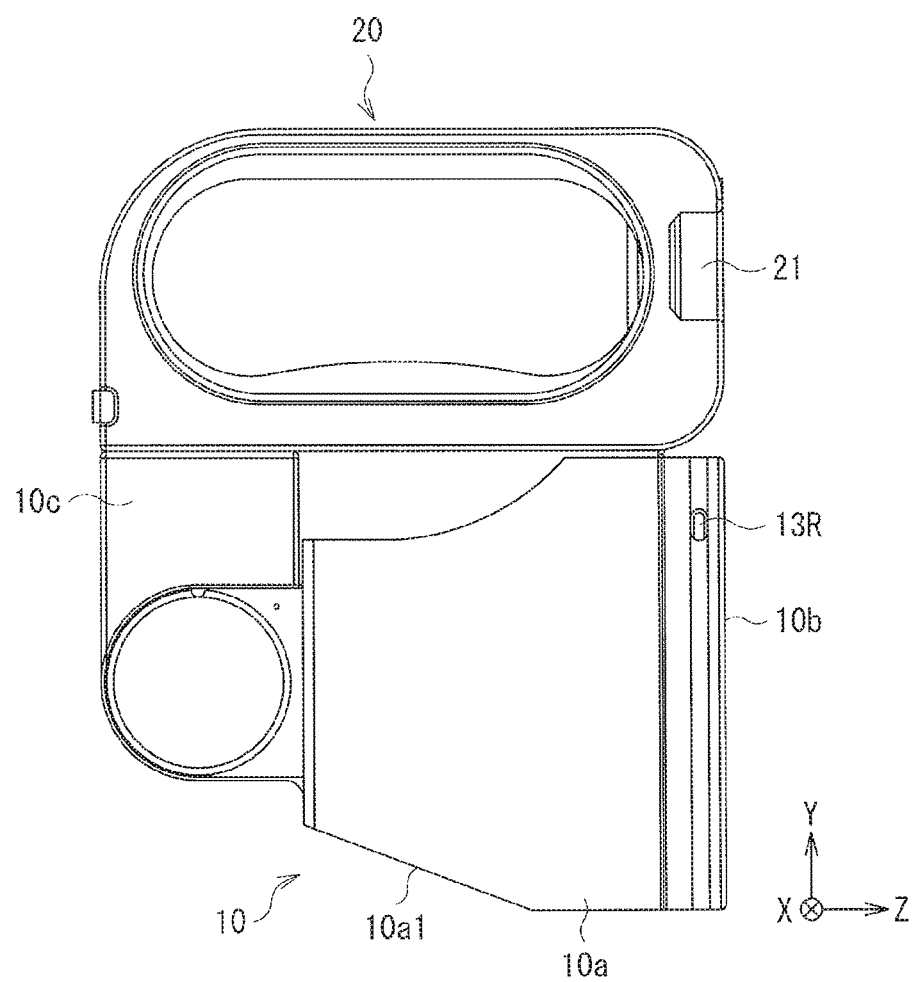

[ FIG. 5A ]
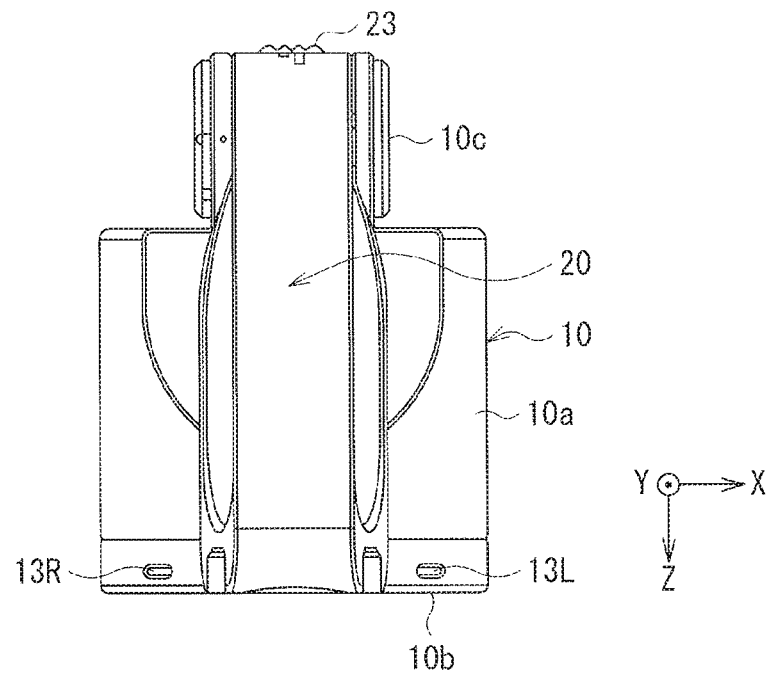
[ FIG. 5B ]
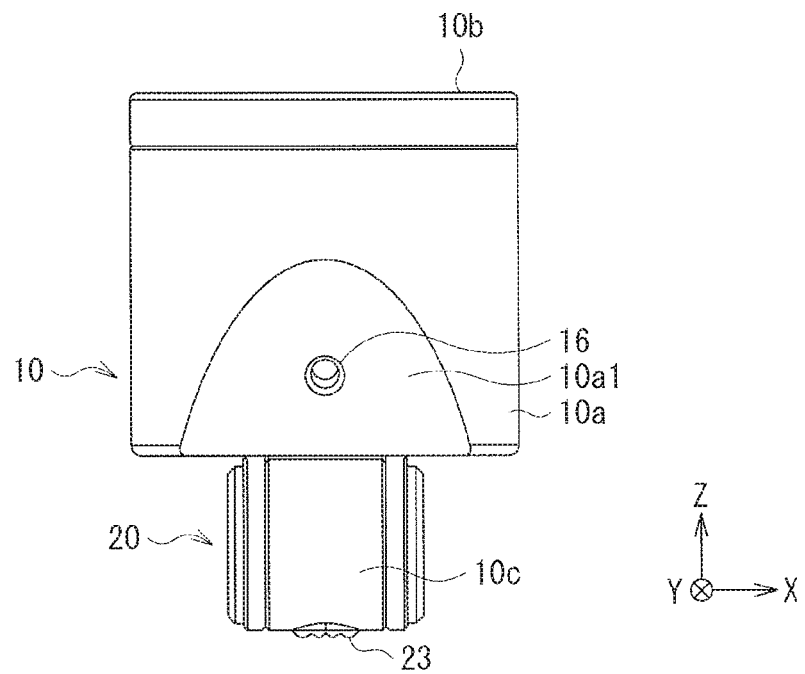

[ FIG. 6A ]
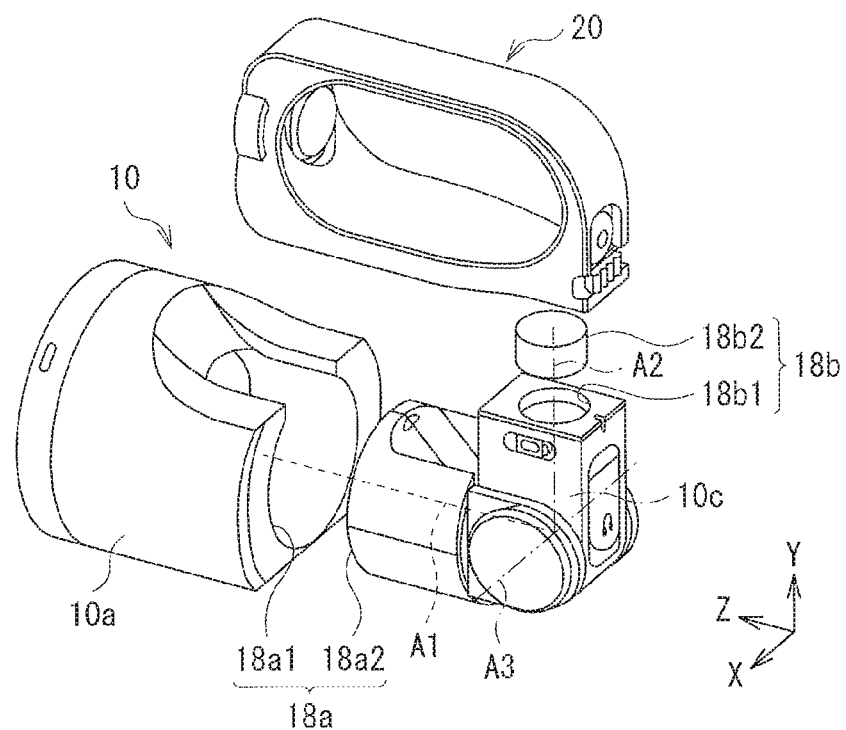
[ FIG. 6B ]
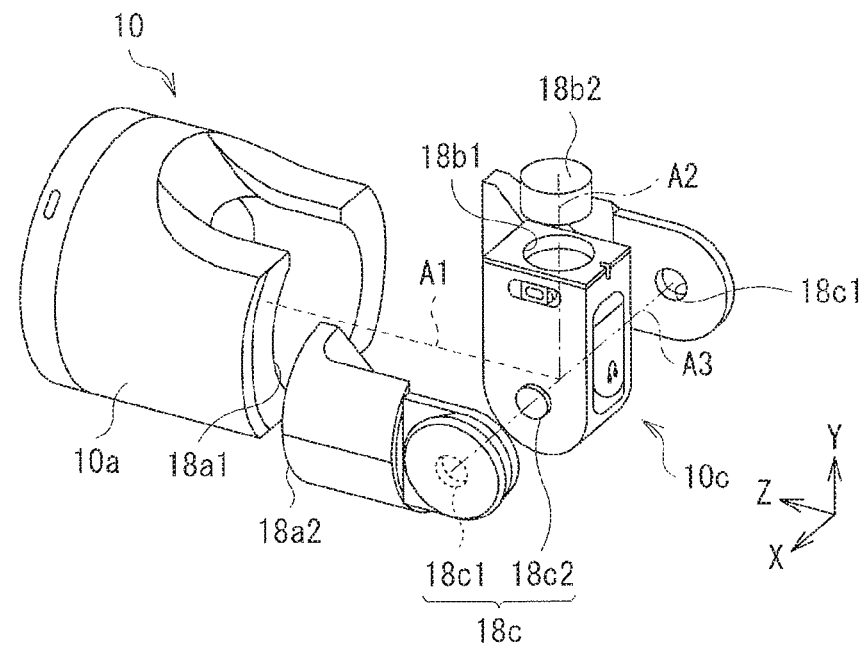

[ FIG. 7A ]
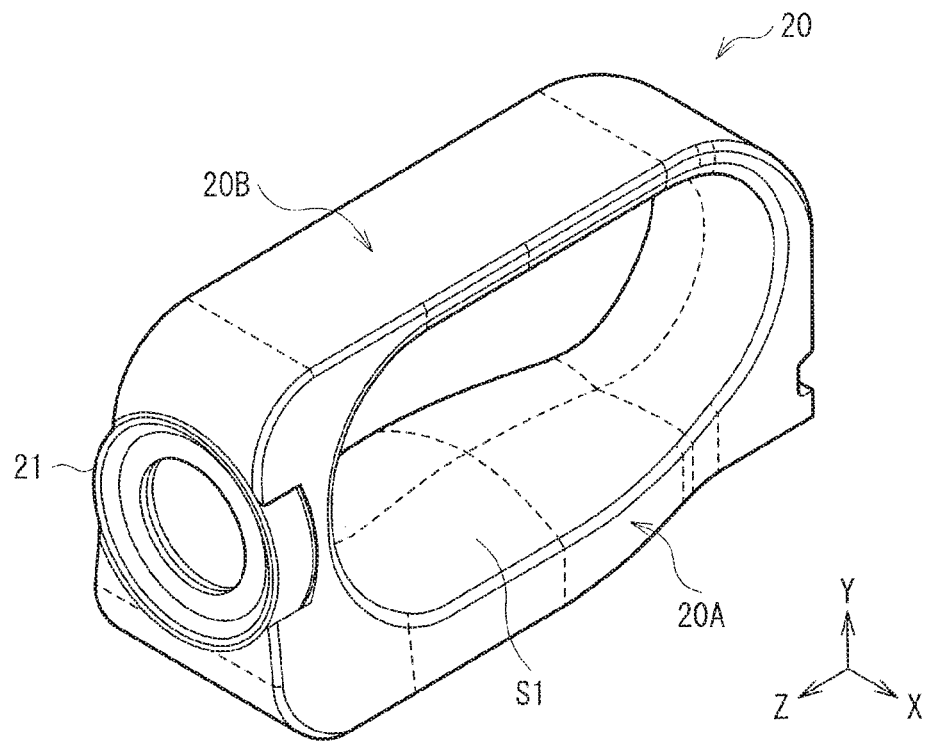
[ FIG. 7B ]
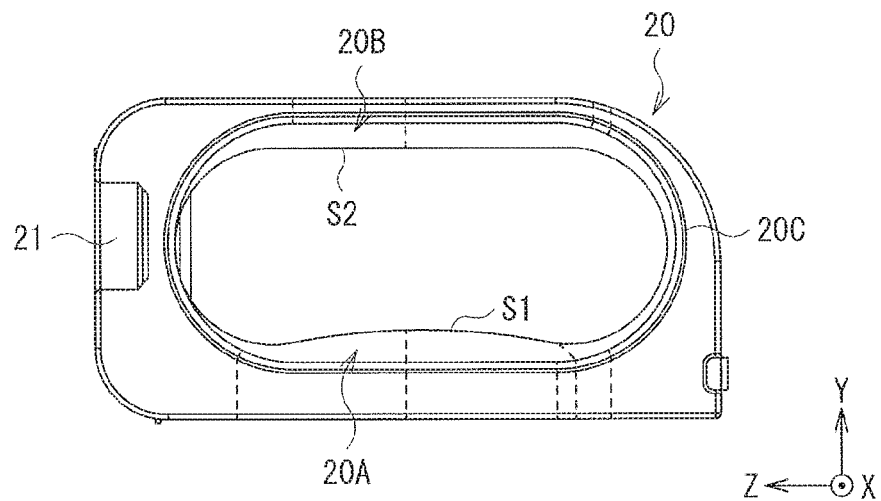

[ FIG. 7C ]
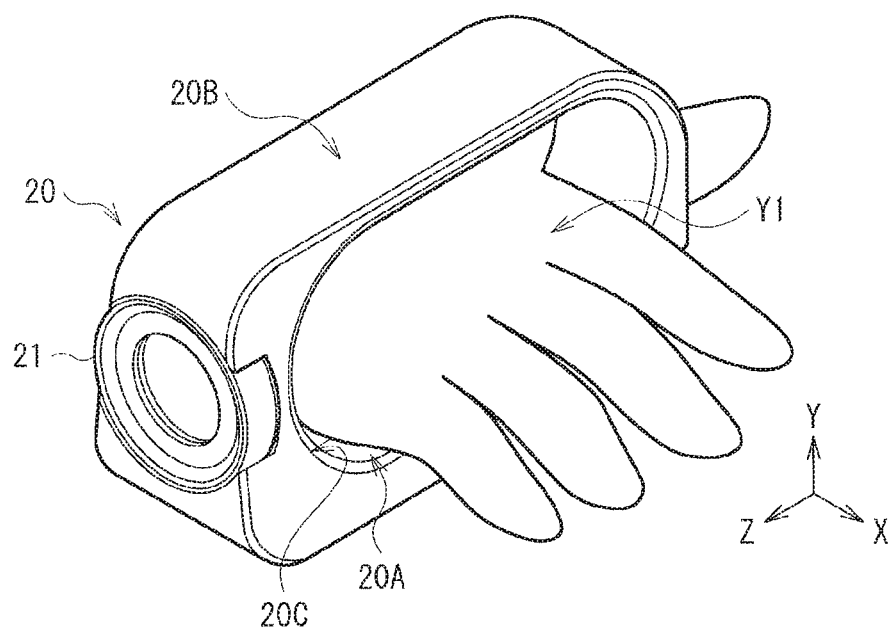
[ FIG. 7D ]
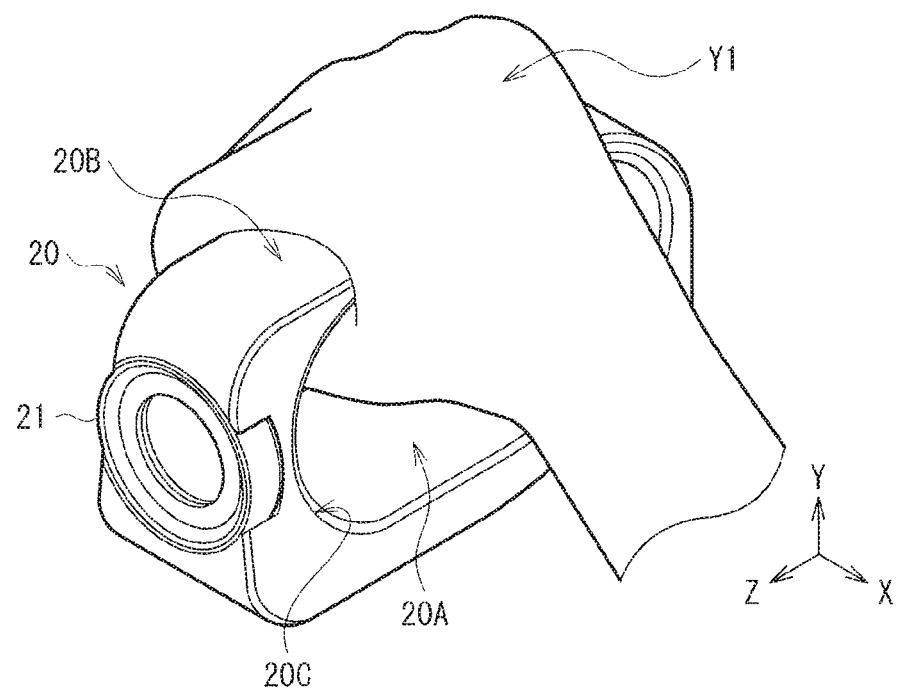

[ FIG. 8A ]
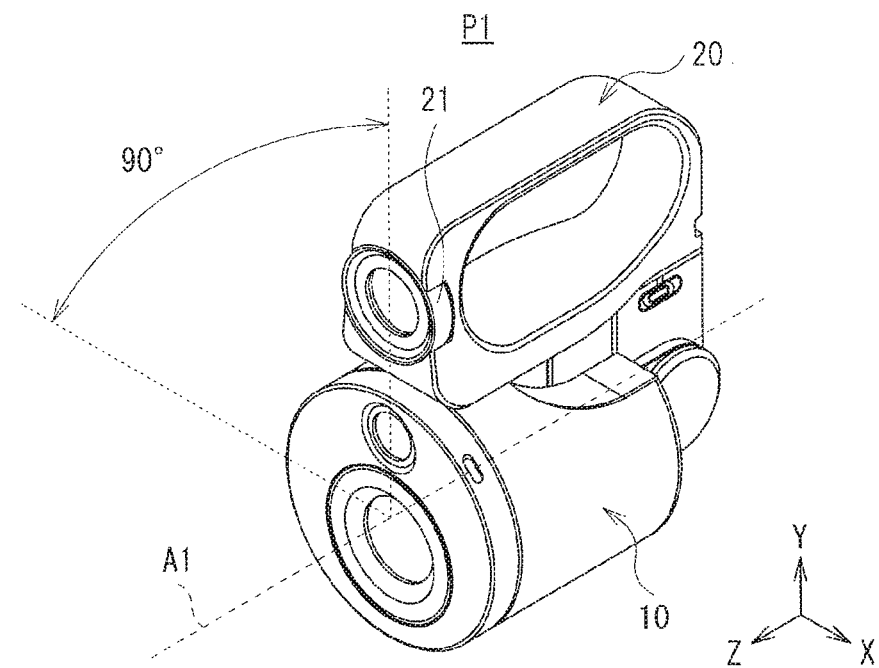
[ FIG. 8B ]
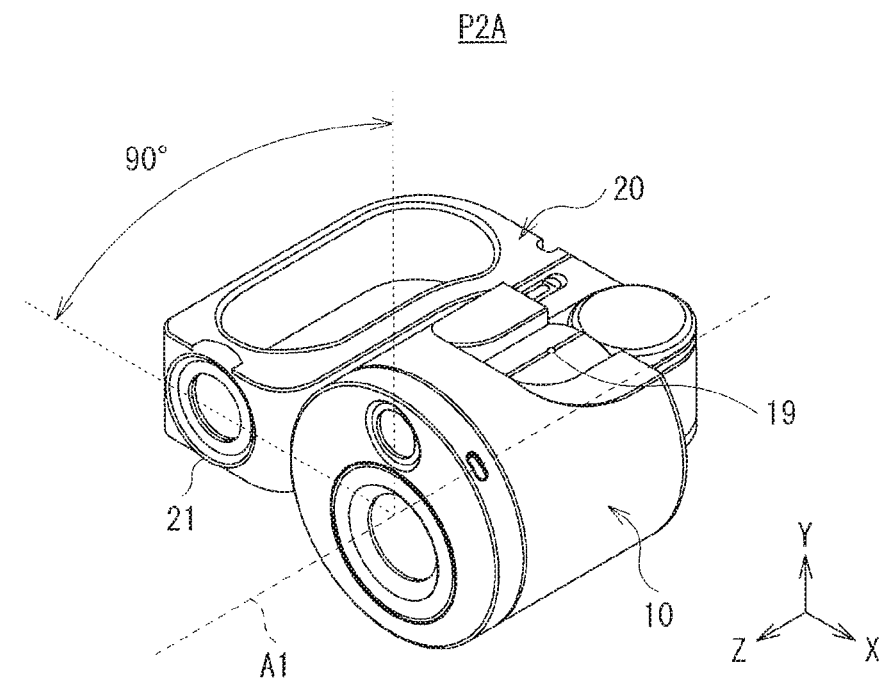

[ FIG. 9A ]
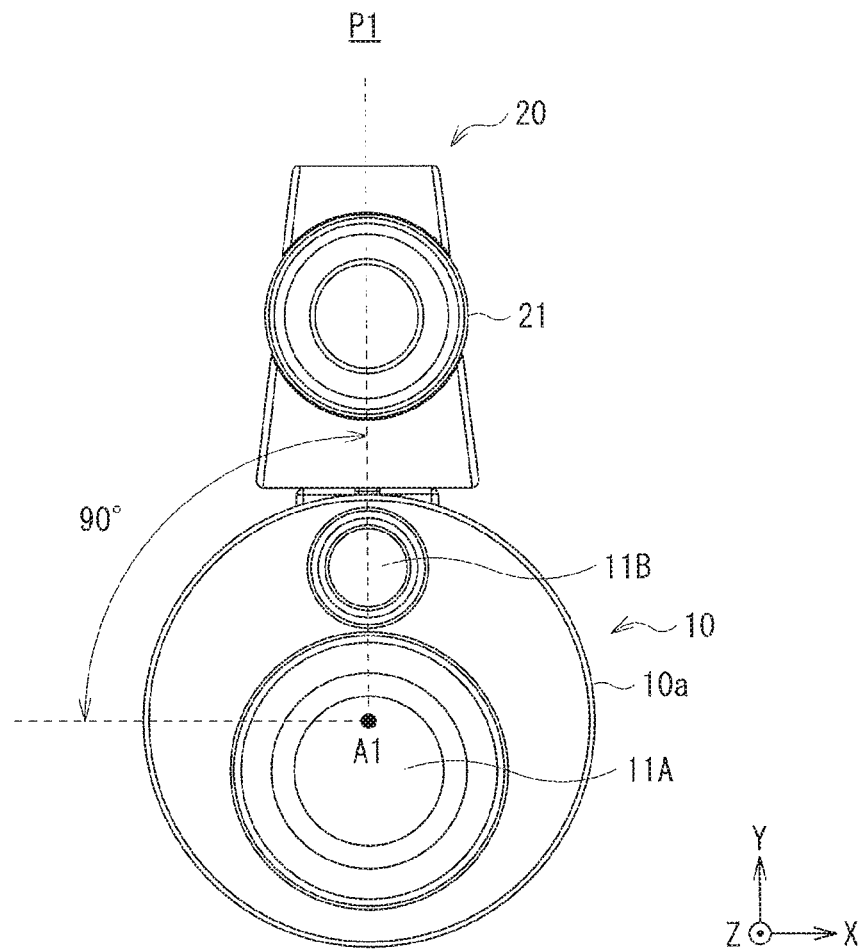
[ FIG. 9B ]
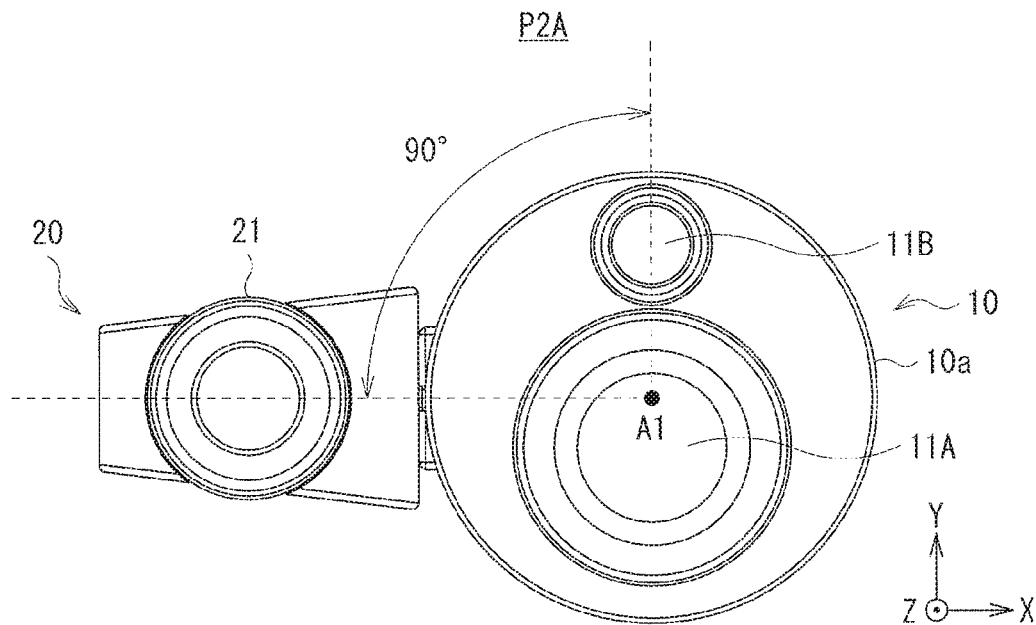

[ FIG. 10A ]
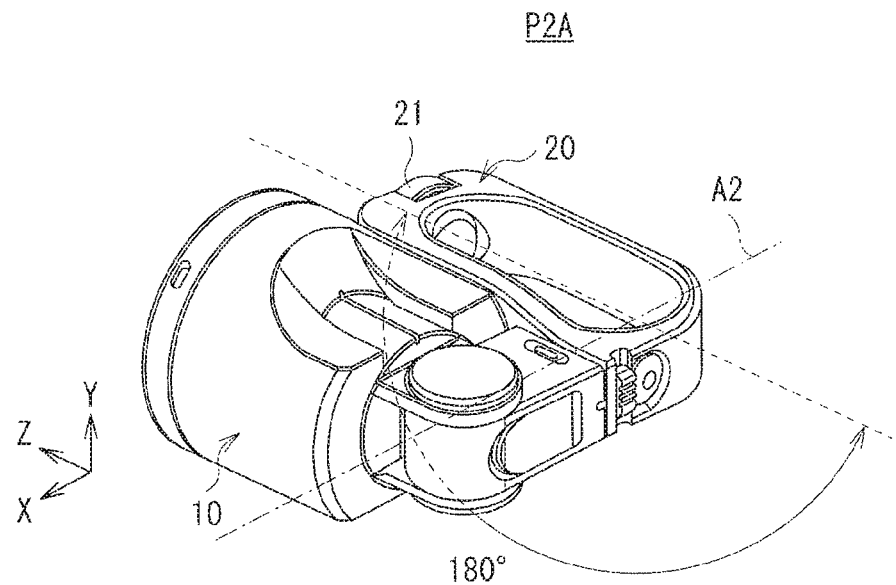
[ FIG. 10B ]
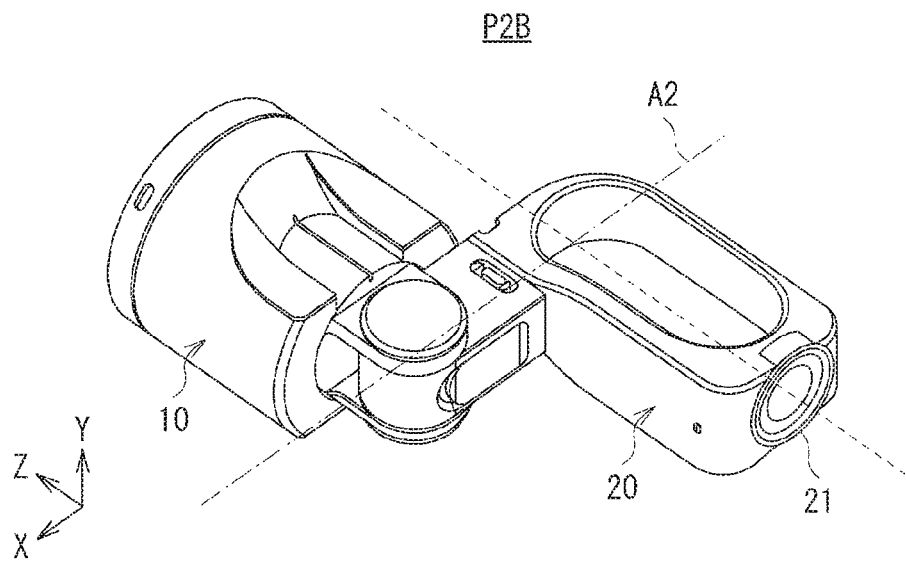

[ FIG. 11A ]
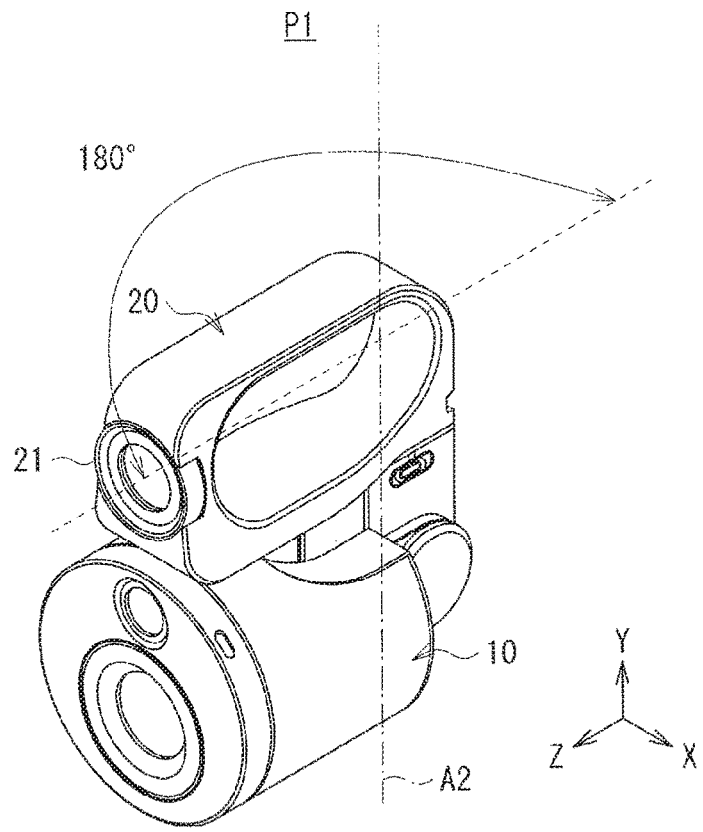
[ FIG. 11B ]
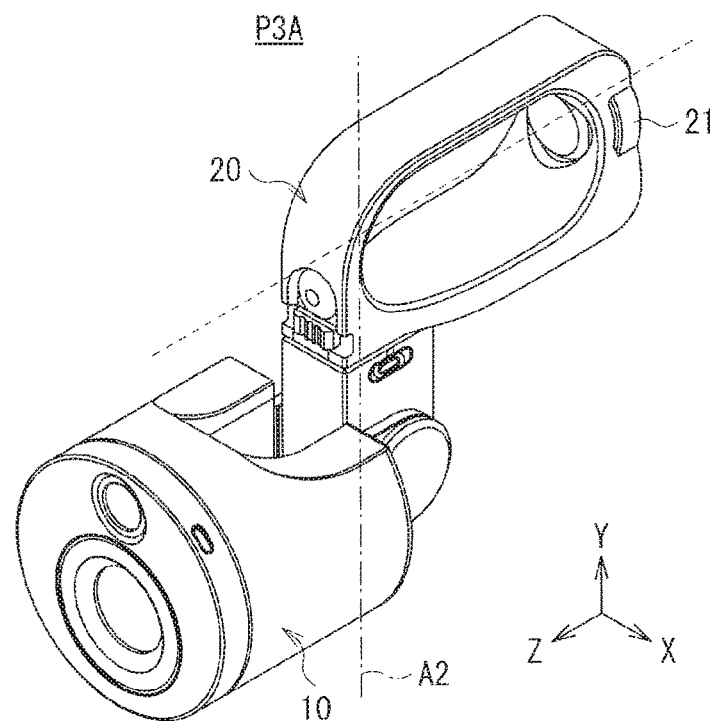

[ FIG. 12A ]
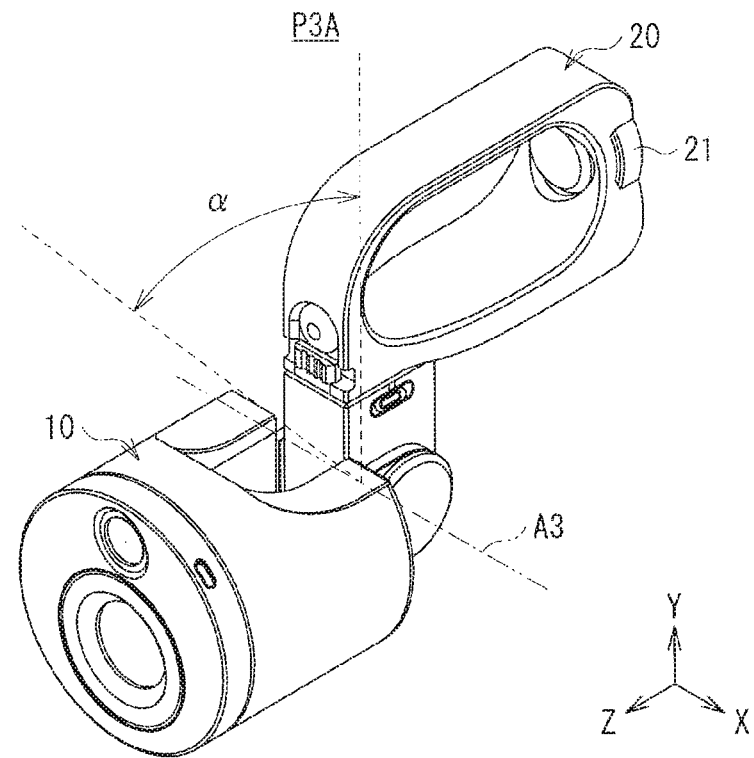
[ FIG. 12B ]
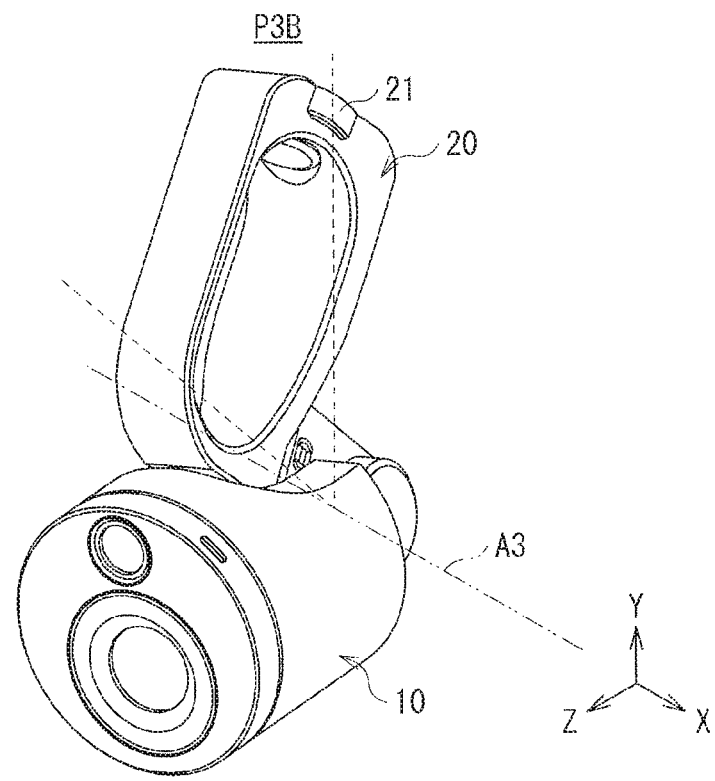

[ FIG. 13A ]
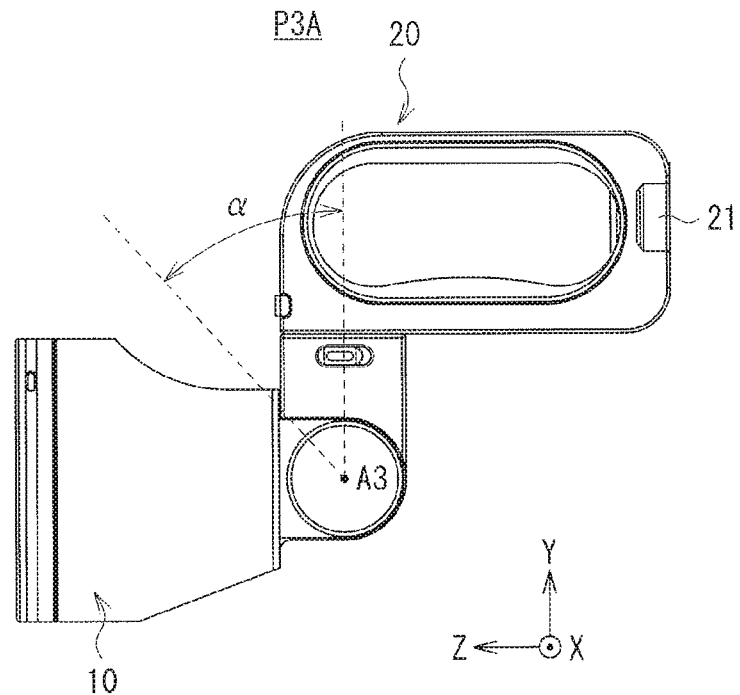
[ FIG. 13B ]
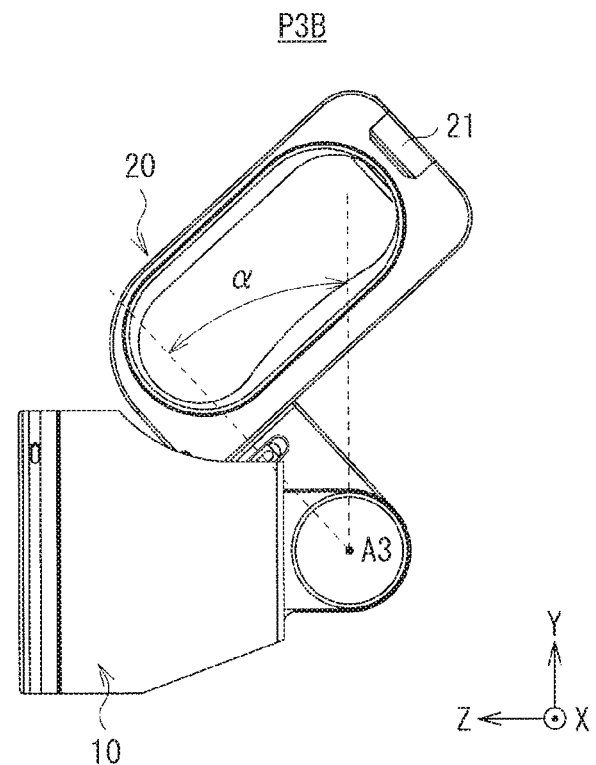

[ FIG. 14 ]
PLACE-AND-SHOOT STYLE (P1)
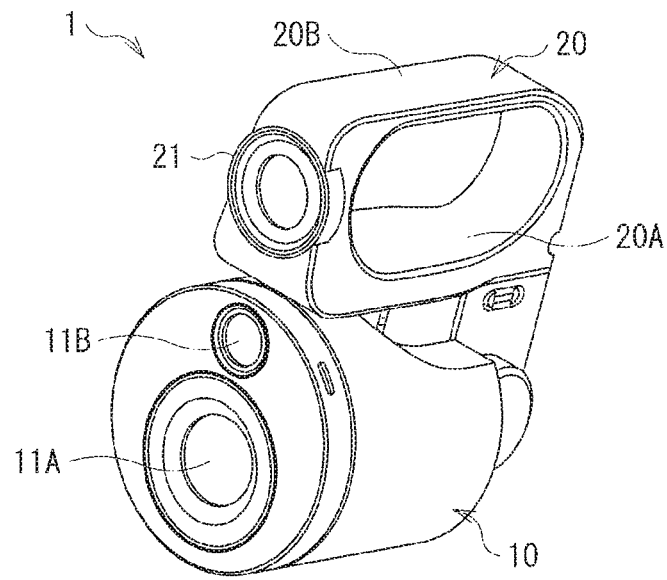
[ FIG. 15 ]
PLACE-AND-SHOOT STYLE (P3B)
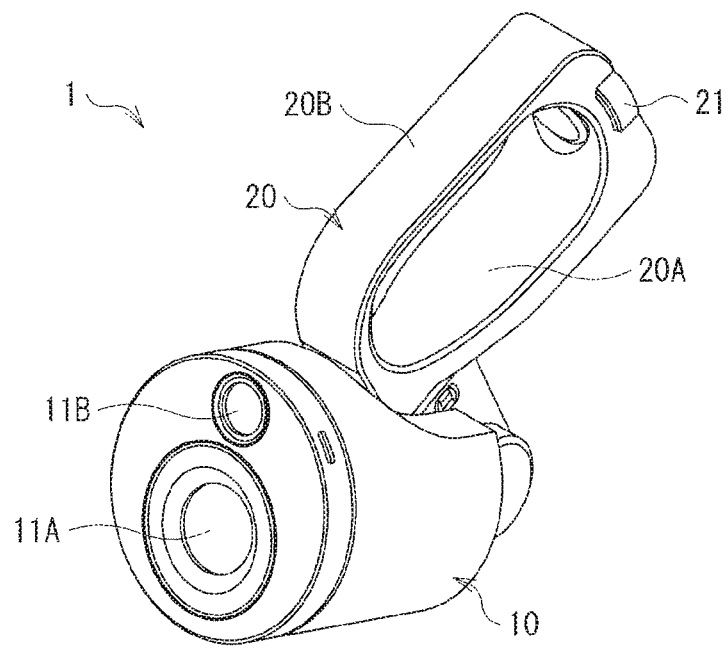

[ FIG. 16 ]
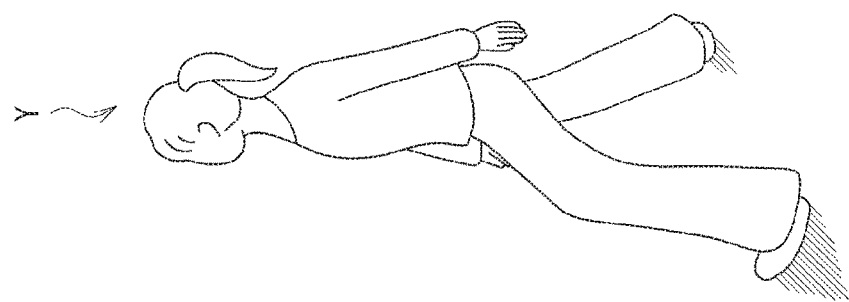
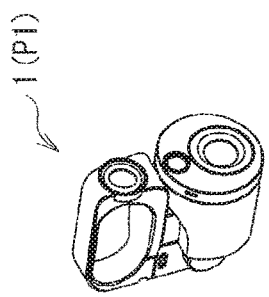

[ FIG. 17 ]
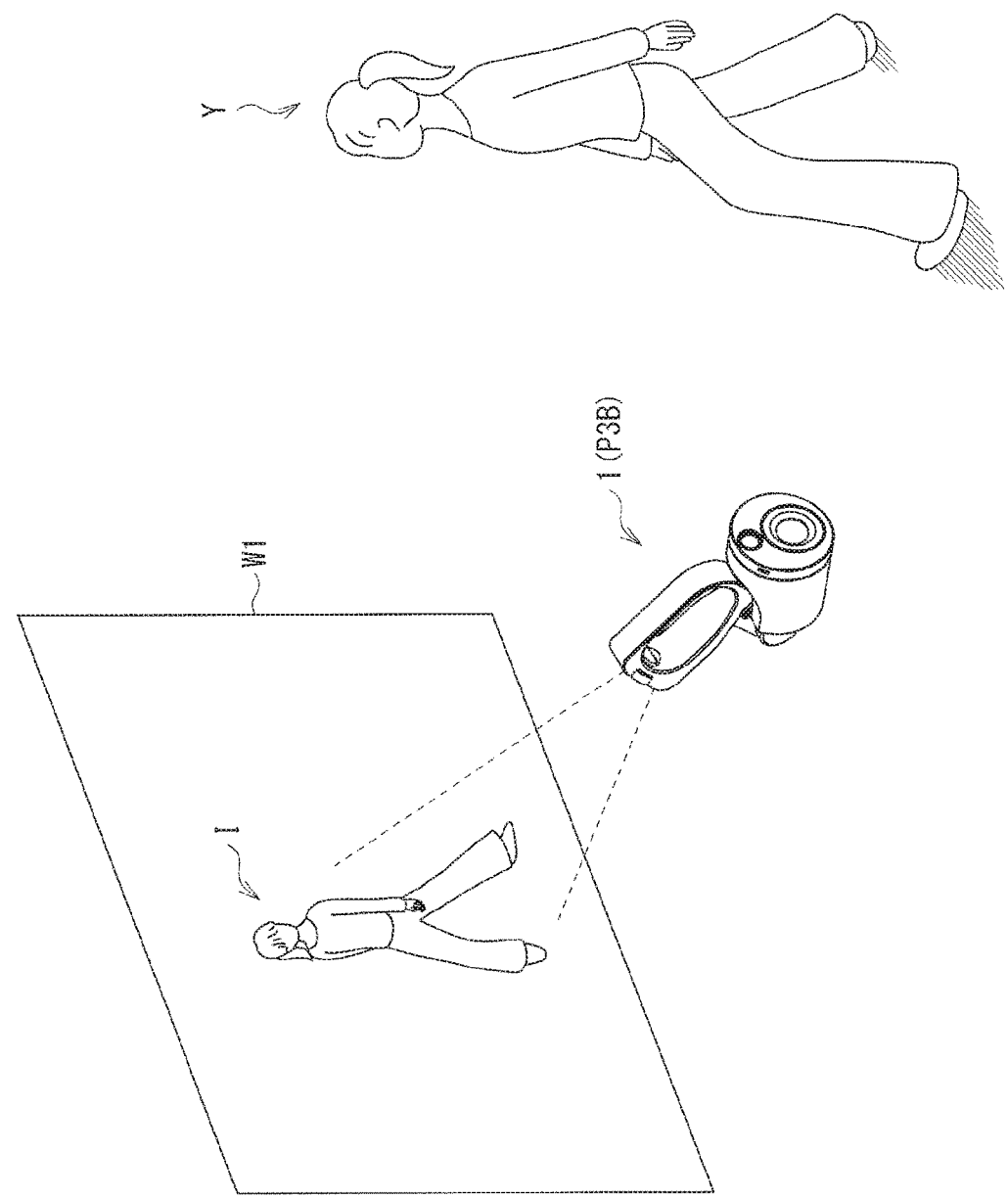

[ FIG. 18 ]
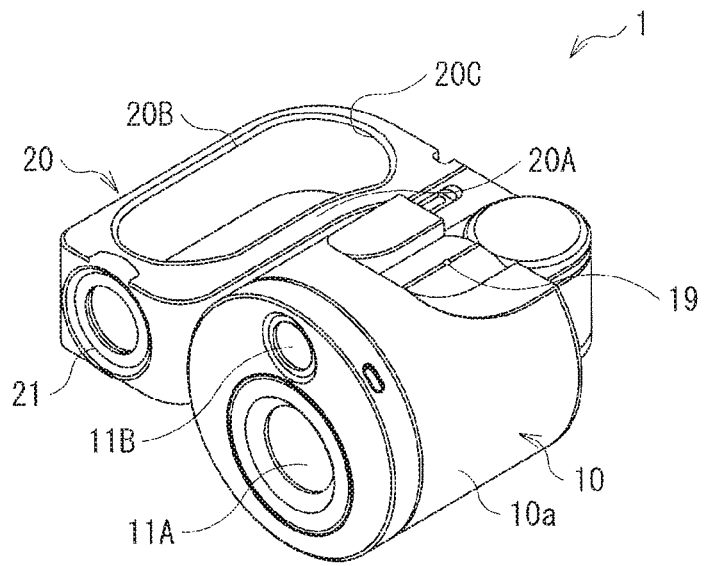
[ FIG. 19 ]
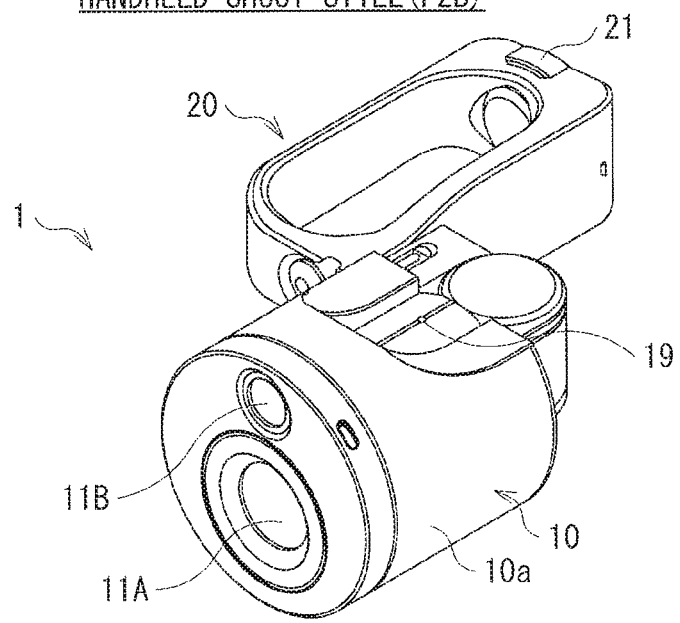

[FIG. 20A]
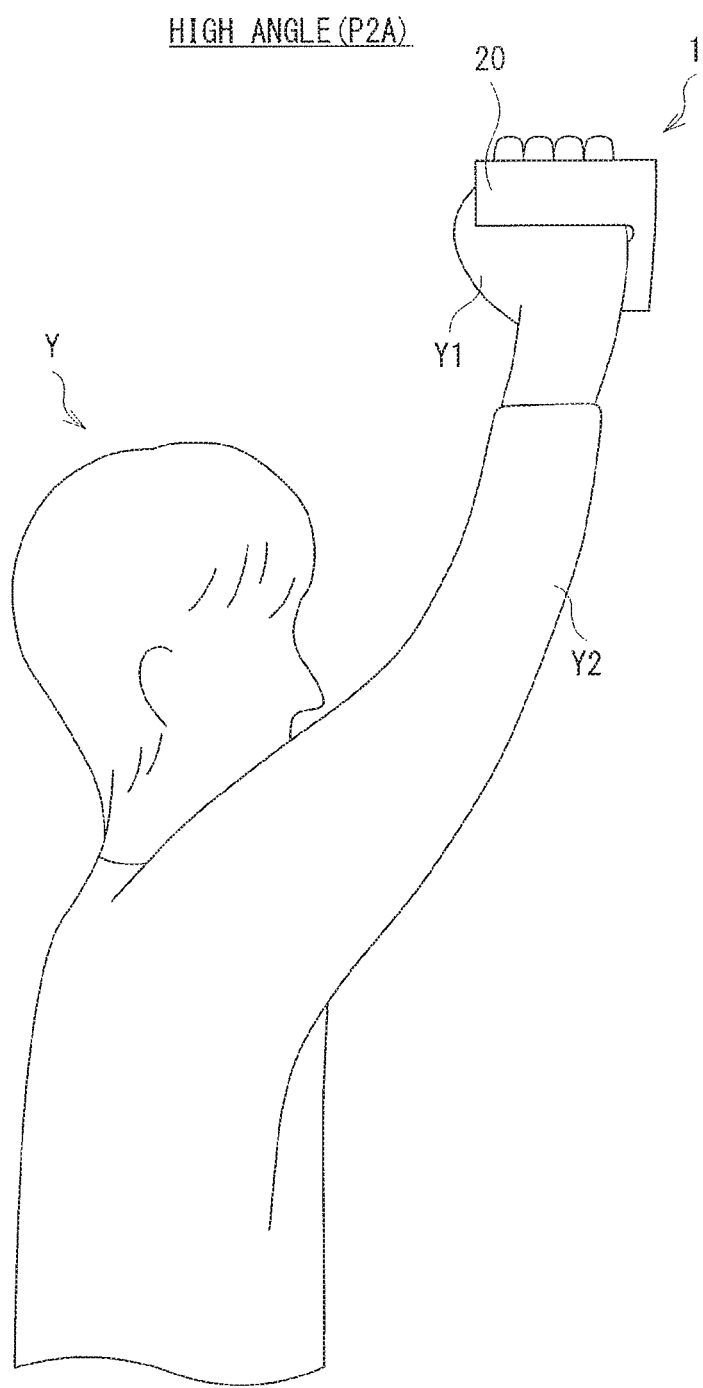

[FIG. 20B]
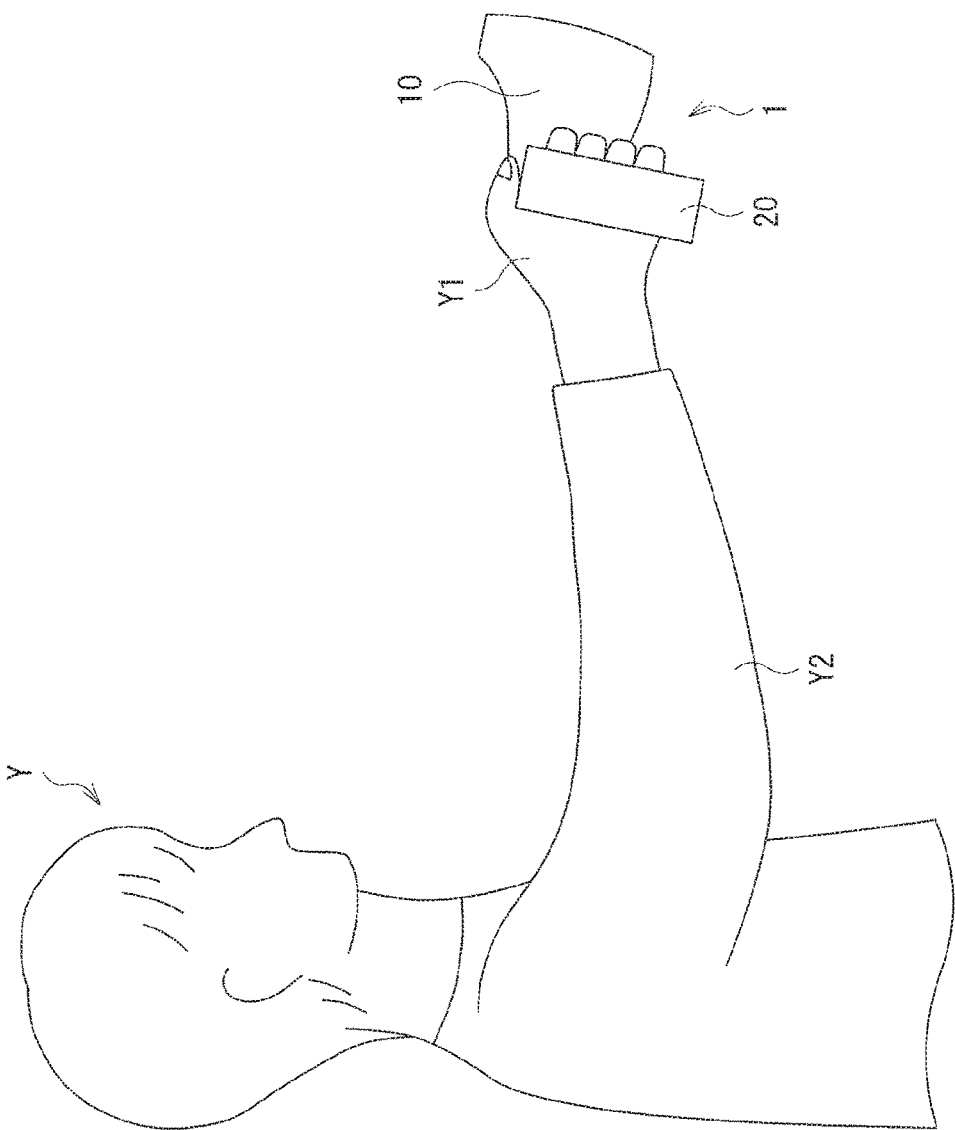

[FIG. 20C]
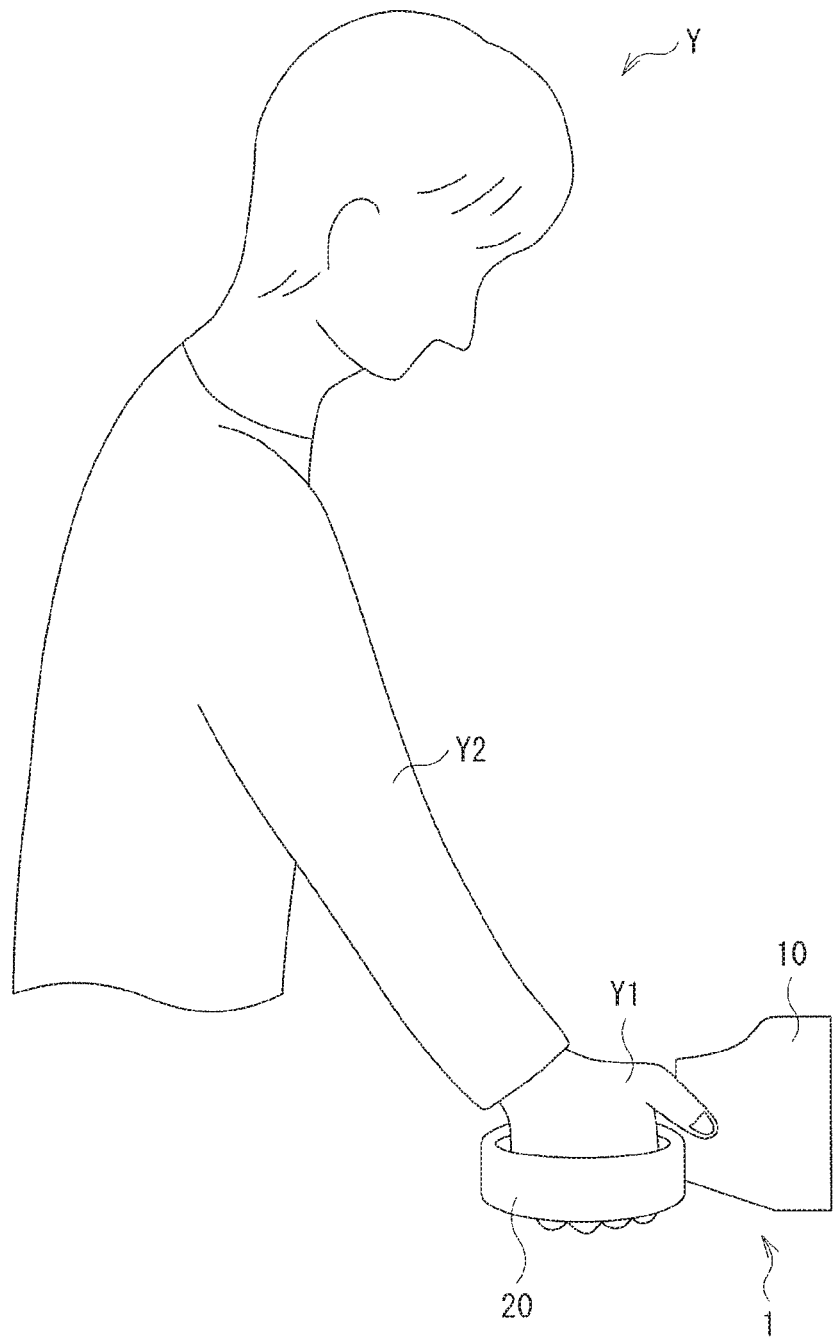

[ FIG. 21 ]
ACCESSORY MOUNTING EXAMPLE (P2A)
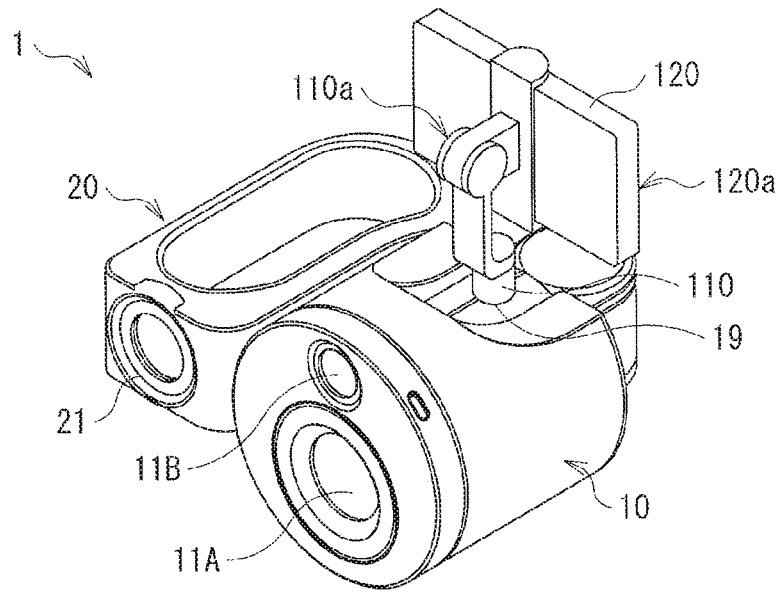
[ FIG. 22 ]
ACCESSORY MOUNTING EXAMPLE (P2B)
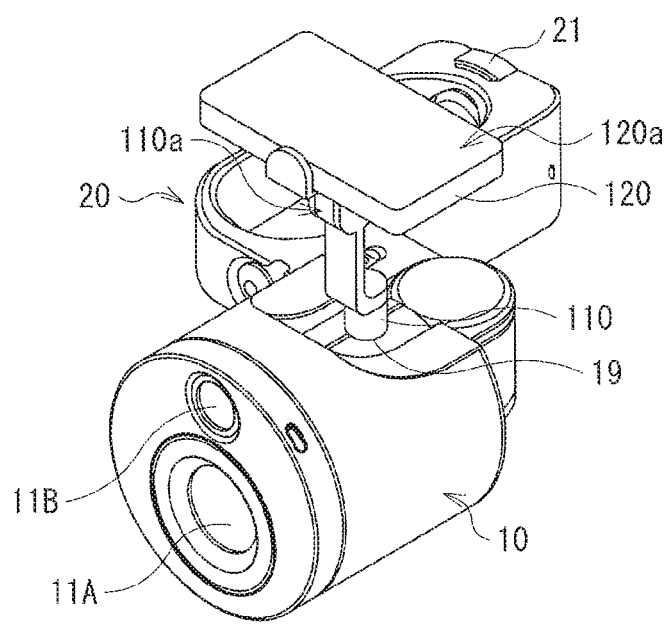

IMAGE PICKUP UNIT FOR CONCURRENTLY SHOOTING AN OBJECT AND PROJECTING ITS IMAGE

CROSS REFERENCE TO RELATED APPLICATIONS

This application is a U.S. National Phase of International Patent Application No. PCT/JP2015/001992 filed on Apr. 9, 2015, which claims priority benefit of Japanese Patent Application No. JP 2014-097847 filed May 9, 2014, the entire contents of which is incorporated herein by reference.

TECHNICAL FIELD

The present disclosure relates to an image pickup unit used as, for example, a video camera.

BACKGROUND ART

Some of image pickup units such as video cameras include a grip belt mounted on a camera body to enable shooting in a state (a handheld state) in which the camera body is held with a hand (for example, refer to PTLs 1 and 2).

CITATION LIST

Patent Literature

[PTL 1] Japanese Unexamined Patent Application Publication No. 2006-295273
[PTL 2] Japanese Unexamined Patent Application Publication No. 2003-234934

SUMMARY

Technical Problem

In the field of the above-described image pickup units, it is desirable to achieve an image pickup unit having not only a primary image pickup function of a camera but also an image projection function. Moreover, easy adjustment of a projection position is desired.

It is desirable to provide an image pickup unit capable of having an image projection function and easily adjusting a projection position.

Solution to Problem

According to an embodiment of the present disclosure, there is provided an image pickup unit including: a main body including a lens and an image pickup device; and a grip mounted on the main body and including a projector.

In the image pickup unit according to the embodiment of the present disclosure, the grip mounted on the main body includes the projector. Therefore, the user is allowed not only to shoot a subject but also to project an image. Moreover, a position, a direction, and the like of the main body or the projector are allowed to be adjusted with use of the grip.

Advantageous Effects of Invention

In the image pickup unit according to the embodiment of the present disclosure, the grip is mounted on the main body, and the grip includes the projector. Therefore, the user is allowed to project an image, and is allowed to adjust a projection position with use of the grip. Accordingly, the image pickup unit is capable of having an image projection function and easily adjusting the projection position.

It is to be noted that the above description is merely an example of the embodiment of the present disclosure. Effects of the embodiment of the present disclosure are not limited to effects described here, and may be different from the effects described here or may further include any other effect.

It is to be understood that both the foregoing general description and the following detailed description are exemplary, and are intended to provide further explanation of the technology as claimed.

BRIEF DESCRIPTION OF DRAWINGS

FIG. 1 is a perspective view illustrating a configuration (on a front side) of an image pickup unit according to an embodiment of the present disclosure.

FIG. 2 is a perspective view illustrating a configuration (on a back side) of the image pickup unit illustrated in FIG. 1.

FIG. 3A is a front view of the image pickup unit illustrated in FIG. 1.

FIG. 3B is a back view of the image pickup unit illustrated in FIG. 1.

FIG. 4A is a right side view of the image pickup unit illustrated in FIG. 1.

FIG. 4B is a left side view of the image pickup unit illustrated in FIG. 1.

FIG. 5A is a plan view (a top view) of the image pickup unit illustrated in FIG. 1.

FIG. 5B is a bottom view of the image pickup unit illustrated in FIG. 1.

FIG. 6A is an exploded perspective view for describing a configuration of a connection section illustrated in FIG. 1.

FIG. 6B is an exploded perspective view for describing the connection section illustrated in FIG. 1.

FIG. 7A is a perspective view of a grip illustrated in FIG. 1.

FIG. 7B is a right side view of the grip illustrated in FIG. 6A.

FIG. 7C is a perspective view illustrating a usage state of the grip illustrated in FIG. 1.

FIG. 7D is a perspective view illustrating another usage state of the grip illustrated in FIG. 1.

FIG. 8A is a perspective view for describing a rotation operation about a first shaft of the grip, and illustrates a state (a position P1) in a basic position.

FIG. 8B is a perspective view for describing the rotation operation about the first shaft of the grip, and illustrates a state (a position P2A) in which the grip has been rotated by 90 degrees from the position P1.

FIG. 9A is a diagram viewed from a front side of the rotation operation (in the position P1) illustrated in FIG. 8A.

FIG. 9B is a diagram viewed from the front side of the rotation operation (in the position P2A) illustrated in FIG. 8B.

FIG. 10A is a perspective view for describing a rotation operation about a second shaft of the grip, and illustrates a position P2A.

FIG. 10B is a perspective view for describing the rotation operation about the second shaft of the grip, and illustrates a state (a position P2B) in which the grip has been rotated by 180 degrees from the position 2A.

FIG. 11A is a perspective view for describing the rotation operation about the second shaft of the grip, and illustrates the position P1.

FIG. 11B is a perspective view for describing the rotation operation about the second shaft of the grip, and illustrates a state (a position P3A) in which the grip has been rotated by 180 degrees from the position P1.

FIG. 12A is a perspective view for describing a rotation operation about a third shaft of the grip, and illustrates a state (a position P3A) before angle adjustment.

FIG. 12B is a perspective view for describing the rotation operation about the third shaft of the grip, and illustrates a state (a position P3B after angle adjustment) in which the grip has been rotated by a predetermined angle from the position P3A.

FIG. 13A is a diagram viewed from a right side of the rotation operation (in the position P3A) illustrated in FIG. 12A.

FIG. 13B is a diagram viewed from the right side of the rotation operation (in the position P3B) illustrated in FIG. 12B.

FIG. 14 is a perspective view for describing a place-and-shoot style (in the position P1).

FIG. 15 is a perspective view for describing the place-and-shoot style (in the position P3B).

FIG. 16 is a diagram for describing a usage example in the style (in the position P1) illustrated in FIG. 14.

FIG. 17 is a diagram for describing a usage example in the style (in the position P3B) illustrated in FIG. 15.

FIG. 18 is a perspective view for describing a handheld-shoot style (in the position P2A).

FIG. 19 is a perspective view for describing the handheld-shoot style (in the position P2B).

FIG. 20A is a diagram for describing a usage example in the style (in the position P2A) illustrated in FIG. 18.

FIG. 20B is a diagram for describing a state in the middle of a change from the position P2A (a high angle) to the position P2B (a low angle).

FIG. 20C is a diagram for describing a usage example in the style (in the position P2B) illustrated in FIG. 19.

FIG. 21 is a perspective view illustrating an accessory mounting example in the style (in the position P2A) illustrated in FIG. 18.

FIG. 22 is a perspective view illustrating an accessory mounting example in the style (in the position P2B) illustrated in FIG. 19.

DESCRIPTION OF EMBODIMENTS

Some embodiments of the present disclosure will be described in detail below referring to the accompanying drawings. It is to be noted that description will be given in the following order.
1. Embodiment
(1) Configuration
* Description of Respective Components
* Description of Rotation Operation and Position of Grip
(2) Effects and Usage Examples
Configuration FIGS. 1 and 2 illustrate an entire configuration of an image pickup unit (an image pickup unit 1) according to an embodiment of the present disclosure. FIGS. 3A, 3B, 4A, 4B, 5A, and 5B illustrate a front view, a back view, a right side view, a left side view, a plan view (a top view), and a bottom view, respectively. The image pickup unit 1 may be, for example, an image pickup unit used as a video camera or the like, and includes a camera body 10 (a main body).

The camera body 10 includes a lens (for example, a zoom lens 11A and a wide-angle lens 11B) and an image pickup device (an image sensor, not illustrated). A grip 20 is mounted on this camera body 10 (more specifically, a connection section 10c (that will be described later) of the camera body 10). As will be described in detail later, the grip 20 is rotatable about a predetermined shaft, and is allowed to take various positions depending on a positional relationship with the camera body 10. Therefore, in the image pickup unit 1, shooting styles (shooting techniques and shooting systems) depending on the intended use are achieved. It is to be noted that FIGS. 1 to 5B illustrate a basic position and a basic state (corresponding to a position P1 that will be described later) in which the grip 20 is placed directly above an enclosure of the camera body 10.

As used herein, a direction parallel to an optical axis of the image pickup unit 1 (the camera body 10) refers to "Z", a surface on a subject side along the Z direction refers to front (a front surface), and a surface on an image side refers to back (a back surface). Moreover, description will be given below referring to a vertical direction and a horizontal direction when viewed from the front as "Y" and "X", respectively. It is to be noted that the "optical axis" of the camera body 10 may pass through, for example, the lens and the image pickup device along the Z direction. In this case, the camera body 10 includes two kinds of lenses (the zoom lens 11A and the wide-angle lens 11B), and the image pickup device is provided to each of the lenses. Therefore, the camera body 10 has respective optical axes corresponding to the zoom lens 11A and the wide-angle lens 11B, and these optical axes are arranged substantially in parallel to each other. In this embodiment, the optical axis of the image pickup unit 1 or the camera body 10 corresponds to an optical axis passing through the zoom lens 11A or the wide-angle lens 11B.

(Camera Body 10)

The camera body 10 may include the image pickup device in, for example, a cylindrical enclosure 10a, and includes the zoom lens 11A and the wide-angle lens 11B in a front surface section 10b. The zoom lens 11A and the wide-angle lens 11B may be arranged vertically (along the Y direction) in, for example, an XY plane. More specifically, the zoom lens 11 and the wide-angle lens 11B may be desirably arranged on a lower side and an upper side, respectively. In a place-and-shoot style that will be described later, shooting is performed in a state in which the image pickup unit 1 is placed on a floor or the like; therefore, the wide-angle lens 11B may be desirably located in a position away from a bottom surface of the enclosure 10a to prevent appearance of a floor surface in an image. The image pickup device may be, for example, a CCD (Charge Coupled Device) or CMOS (Complementary Metal-Oxide Semiconductor) image sensor. This image pickup device is arranged on the optical axis of each of the zoom lens 11A and the wide-angle lens 11B. During shooting, one of the zoom lens 11A and the wide-angle lens 11B may be used, or both the zoom lens 11A and the wide-angle lens 11B may be used concurrently.

Stereo microphones 13L and 13R are arranged at positions close to the front surface section 10b of the enclosure 10a (refer to FIGS. 4A, 4B, and 5A). In this case, the stereo microphone 13L and the stereo microphone 13R are located at an obliquely upper right position and an obliquely upper left position when viewed from the front, respectively, to be bilaterally symmetric to each other (line-symmetric with respect to the Y axis). The stereo microphones 13L and 13R may be desirably provided at positions exposed from the grip 20 (not hidden under the grip 20) in any of positions (positions P1, P2A, P2B, P3A, and P3B) of the grip 20 that will be described later.

A part on a bottom surface side of the enclosure 10a is obliquely cut away (beveled) (the enclosure 10a has a tapered surface 10a1) (refer to FIGS. 4A, 4B, and 5B). During place-and-shoot that will be described later, the image pickup unit 1 is placed on a floor to bring the tapered surface 10a1 into contact with a floor surface. Accordingly, the optical axis is inclined obliquely upward with respect to the front in a state in which the image pickup unit 1 is placed; therefore, a distant subject is allowed to be easily shot. Moreover, a tripod screw hole 16 is provided to this tapered surface 10a1. Shooting is allowed to be performed in a state in which a tripod is engaged in this tripod screw hole 16.

The camera body 10 includes a connection portion (the connection section 10c) with the grip 20 in a position closer to the back thereof. The connection section 10c includes a rotation mechanism (hinge) forming rotation shafts (shafts A1, A2, and A3) of the grip 20. FIGS. 6A and 6B illustrate exploded perspective views of main-part configurations of the camera body 10 and the grip 20. However, the configuration of the connection section 10c described here is an example. As long as the connection section 10c has a mechanism rotatable about the shafts A1, A2, and A3, the connection section 10c may have any other configuration.

As illustrated in FIG. 6A, a hinge 18a forming the shaft A1 is configured of a depression section 18a1 and a protrusion section 18a2 that are rotatably fit together. Rotation about the shaft A1 by the hinge 18a may be limited to, for example, a predetermined angle range (for example, 0 to 90 degrees that will be described later).

A hinge 18b forming the shaft A2 is configured of a depression section 18b1 and a protrusion section 18b2 that are rotatably fit together. Rotation about the shaft A2 by the hinge 18b may be limited to, for example, a predetermined angle range (for example, 0 to 180 degrees that will be described later).

As illustrated in FIG. 6B, a hinge 18c forming the shaft A3 is configured of a depression section 18c1 and a protrusion section 18c2 that are rotatably fit together. Rotation about the shaft A3 by the hinge 18c may be limited to, for example, a predetermined angle range (for example, 0 to alpha that will be described later).

A power supply button 12 may be provided on, for example, a side surface of the connection section 10c (refer to FIGS. 1, 2, and 4A), and a plug slot 14 may be provided on, for examples, a back surface of the connection section 10c (refer to FIGS. 2 and 3B). In this plug slot 14, for example, a power plug slot and a headphone jack may be provided, and may be coated with a cover. A charge lamp 15 configured of, for example, an LED (Light Emitting Diode) may be also provided to the connection section 10c (refer to FIGS. 2 and 3B).

(Grip 20)

The grip 20 is rotatable about the shaft A1 (a first shaft) along a direction (the Z direction) substantially parallel to the optical axis of the camera body 10. The grip 20 is also rotatable about the shaft A2 (a second shaft) along the Y direction, and is further rotatable about the shaft A3 (a third shaft) along the X direction. These shafts A1, A2, and A3 are rotation shafts formed of hinges (the hinges 18a to 18c that will be described later) built in the connection section 10c of the camera body 10. A rotation operation of the grip 20 about each of these shafts will be described in detail later.

FIG. 7A is a perspective view for describing the configuration of the grip 20, and FIG. 7B is a right side view of the grip 20. It is to be noted that, in FIGS. 7A and 7B, as an auxiliary line, a broken line indicating a shape gradient is illustrated. The grip 20 includes a gripping portion 20A (a first gripping portion) and a gripping portion 20B (a second gripping portion). These gripping portions 20A and 20B extend along a direction substantially parallel to the optical axis (the Z direction) in a basic position (the position P1) of the grip 20. The gripping portion 20A is close to the camera body 10 in the position P1. The gripping portion 20B faces the gripping portion 20A with an opening section 20C (a gap) in between. These gripping portions 20A and 20B are portions gripped by a user; therefore, each of internal surfaces S1 and S2 (on the opening section 20C side) is so shaped as to have a three-dimensional curved surface with a gentle gradient. This grip 20 is equipped with a projector 21 that is configured to project an image.

The gripping portion 20A is a portion used mainly in a handheld shoot style (the positions P2A and P2B) that will be described later. This gripping portion 20A has a substantially flat rectangular parallelepiped shape, and has a larger width (a length in the X direction) than that of the gripping portion 20B. An example of a usage state of the gripping portion 20A is illustrated in FIG. 7C. During handheld shoot, a hand Y1 of the user is inserted (put) into the opening section 20C, and the internal surface S1 of the gripping portion 20A is covered with an entire palm of the hand Y1 of the user. Therefore, the internal surface S1 of the gripping portion 20A may desirably have a convex curved surface that conforms a curve of the palm. This is because fit feeling, ease of holding, and the like during the handheld shoot are allowed to be enhanced. Accordingly, fatigue during the handheld shoot is allowed to be reduced, and hand movement is allowed to be reduced.

The gripping portion 20B is a portion used mainly for position adjustment of the camera body 10 or projection angle adjustment of the projector 21 in the place-and-shoot style (the positions P1, P3A, and P3B) that will be described later. This gripping portion 20B has a substantially flat rectangular parallelepiped shape. An example of a usage state of the gripping portion 20B is illustrated in FIG. 7D. During the place-and-shoot, the user holds the gripping portion 20B with the hand Y1 from an external side (from above). In addition, in the above-described handheld shoot style (refer to FIG. 7C), the back of the hand Y1 of the user comes into contact with or comes close to the internal surface S2 of the gripping portion 20B. Therefore, desirably, the internal surface S2 of the gripping portion 20B may has a three-dimensional curved surface as described above, and may be made of, for example, rubber. This is because ease of gripping and fit feeling of the gripping portion 20B are allowed to be enhanced, and strain on the back of the hand Y1 during the handheld shoot is allowed to be eased. Accordingly, smooth angle adjustment or position adjustment is achievable.

The projector 21 is allowed to project an image to a desired direction (for example, frontward or backward) according to the rotation operation about the shaft A2 of the grip 20. The image projected by this projector 21 may be based on an image signal input from an external device, or may be an image picked up by the camera body 10. For example, in front projection, for example, a graphic image or the like may be projected with use of an image display technique such as so-called projection mapping. Alternatively, in back projection, for example, concurrently with shooting (stand-and-shoot) by the camera body 10, an image shot by the camera body 10 may be projected on a wall or the like on a back side of the camera body 10 (as will be described later).

In the basic position (the position P1), the projector 21 is so arranged in the grip 20 as to face the front (a subject) (front projection is possible). The optical axis of the projector 21 is substantially parallel to the optical axis of the camera body 10. Moreover, even in a state (the position P2A that will be described later) in which the grip 20 has been rotated about the shaft A1 from the position P1, the projector 21 faces the front. Therefore, in the place-and-shoot style (the position P1) that will be described later and the handheld shoot style (the position P2A), the projector 21 is allowed to be used as illumination for shooting by applying emitted light from the projector 21 to a subject. Therefore, the projector 21 may desirably have brighter specifications (higher output power).

An operation button of the camera body 10 is provided on a back surface (a surface opposite to a surface provided with the projector 21) of this grip 20. For example, a REC button 22 for recording, and a zoom sliding key 23 for zoom between wide angle (W) and telephoto (T) may be provided (refer to FIGS. 2, 3B, 5A, and 5B).

Grip Position

The grip 20 may be in any of various position states (positions P1, P2A, P2B, P3A, and P3B) by changing a relative positional relationship with the camera body 10 by a rotation operation about each of the shafts A1, A2, and A3. A specific rotation operation and respective positions of the grip 20 will be described below. It is to be noted that, as an example, a rotation angle of the grip 20 may be 90 degrees or 180 degrees. Moreover, the rotation angle of the grip 20 is not limited to a case where the rotation angle is exactly 90 degrees or 180 degrees, and may have some margins of error, i.e., may be about 90 degrees or about 180 degrees.

(P1 to P2A)

FIGS. 8A and 8B illustrate a position change by a rotation operation about the shaft A1, and FIG. 8A illustrates a state (the position P1) in which the grip 20 is located in the basic position, and FIG. 8B illustrates a state (the position P2A) in which the grip 20 has been rotated by 90 degrees from the position P1. Moreover, FIGS. 9A and 9B illustrate diagrams viewed from the front of the rotation operation about this shaft A1. The grip 20 is rotated about the shaft A1 by 90 degrees from the state in which the grip 20 is located directly above the enclosure 10a of the camera body 10 (the basic position: 0 degrees) to, for example, the left (in a counterclockwise direction) when viewed from the front. Accordingly, the grip 20 changes its position from the position P1 to the position P2A. Moreover, as illustrated in FIG. 9A and 9B, the shaft A1 passes through near a center of the cylindrical enclosure 10a, and the grip 20 is rotated (turned) along a side surface (an arc) of the enclosure 10a within an angle of 0 to 90 degrees.

The position P1 is a basic position of the grip 20 in the image pickup unit 1, and as described above, the position P1 indicates the state in which the grip 20 is located directly above the enclosure 10a. This position P1 is suitable for the place-and-shoot style. As will be described later, the place-and-shoot style is a style in which shooting is performed in a state in which the image pickup unit 1 is placed on, for example, a floor or a stand (a user does not hold the image pickup unit 1 with his hand). In this place-and-shoot style, the image pickup unit 1 is allowed to perform not only shooting of a subject but also image projection with use of the projector 21.

The position P2A may be suitable, for example, for the handheld shoot style from a middle angle to a high angle (a case where the high angle is adopted will be described below as an example). As will be described later, the handheld shoot style is a style in which shooting is performed in a state in which the user uses the grip 20 to hold the camera body 10 with his hand. In this case, the grip 20 is rotated to the left when viewed from the front, and has specifications mainly for right-handed users (specifications for a case in which the user performs shooting while holding the camera body 10 with his right hand). In this case, an accessory screw hole 19 is provided in a top portion of the camera body 10, and this accessory screw hole 19 is visible in the position P2A. In other words, the accessory screw hole 19 hidden under the grip 20 in the position P1 is exposed from the grip 20 in the handheld shoot style, and is turned to a usable state. Moreover, in the position P2A, the projector 21 turns toward the front; therefore, the projector 21 may also function as illumination.

The accessory screw hole 19 is configured to connect an electronic apparatus (such as a smartphone) having a display function to the camera body 10. An accessory holding such an electronic apparatus is allowed to be inserted into the accessory screw hole 19. Therefore, an image picked up by the camera body 10 may be displayed on, for example, the electronic apparatus such as the smartphone.

(P2A to P2B)

FIGS. 10A and 10B illustrate a position change by a rotation operation about the shaft A2, and illustrate the position P2A and a state (the position P2B) in which the grip 20 has been rotated by 180 degrees from the position P2A, respectively. The grip 20 is further rotated about the shaft A2 by 180 degrees from the above-described position P2A in such a manner. Accordingly, the grip 20 changes its position from the position P2A to the position P2B. A track of rotation of the grip 20 at this time passes through below the shaft A2 (forms an arc below the shaft A2). Accordingly, as will be described later, a change from a high angle to a low angle is allowed to be performed smoothly (without releasing the hand from the grip 20).

The position P2B may be suitable, for example, for a low-angle handheld shoot style. As an example, the grip 20 is located on the left of the camera body 10 when viewed from the front, and has specifications mainly for right-handed users (specifications for a case in which the user performs shooting while holding the camera body 10 with his right hand). Even in the position P2A, as with the position P2A, the accessory screw hole 19 is usable.

(P1 to P3A)

FIGS. 11A and 11B illustrate a position change by a rotation operation about the shaft A2, and illustrate the position P1 and a state (the position P3A) in which the grip 20 has been rotated by 180 degrees from the position P1, respectively. The grip 20 is rotated about the shaft A2 by 180 degrees from the position P1 in such a manner. Accordingly, the grip 20 changes its position from the position P1 to the position P3A.

In the position P3A, in the place-and-shoot style, back projection is allowed to be performed while shooting by the camera body 10. In other words, a projection direction of the projector 21 is changed from the front to the back by changing the position of the grip 20 from the position P1 to the position P3A.

(P3A to P3B)

FIGS. 12A and 12B illustrate a position change by a rotation operation about the shaft A3, and illustrate the position P3A and a state (the position P3B) in which the grip 20 has been rotated by an angle "alpha" from the position P3A, respectively. Moreover, FIGS. 13A and 13B illustrate the rotation operation about this shaft A3 when viewed from a right side. The grip 20 is rotated about the shaft A3 within a range of 0 to "alpha" from the position P3A in such a manner. Accordingly, the grip 20 changes its position from the position P3A to the position P3B. In other words, during back projection in the place-and-shoot style, a projection angle of the projector 21 is allowed to be adjusted.

In the position P3B, in the place-and-shoot style, back projection is allowed to be performed while shooting by the camera body 10. Moreover, the projection angle is adjusted; therefore, an image is allowed to be projected in a desired angle direction.

Effects and Usage Examples

In the image pickup unit 1 of this embodiment, the grip 20 is equipped with the projector 21; therefore, the user is allowed not only to shoot a subject but also to project an image. Moreover, positions, directions, and the like of the camera body 10 and the projector 21 are allowed to be easily adjusted with use of the grip 20. Therefore, the image pickup unit 1 is capable of having an image projection function and easily adjusting a projection position.

Further, in the image pickup unit 1, the grip 20 is rotatable about the shaft A1; therefore, for example, the grip 20 is allowed to easily change from the place-and-shoot style (the position P1) to the handheld shoot style (the position P2A). Therefore, the user is allowed to achieve shooting at various angles with use of the grip 20. Furthermore, specifically in the position P2A, the projector 21 is allowed to function as illumination for shooting by using the projector 21 to apply emitted light from the projector 21 to a subject.

Moreover, the grip 20 is rotatable about the shaft A2; therefore, in the place-and-shoot style, the grip 20 is allowed to easily change its position from the position P1 to the position P3A, i.e., from front projection to back projection. Further, an image is allowed to be projected not only to the front and the back but also to an arbitrary direction in 360 degrees.

Further, since the grip 20 is rotatable about the shaft A3, during back projection in the place-and-shoot style, the grip 20 is allowed to change its position from the position P3A to the position P3B, i.e., the projection angle of the projector 21 is allowed to be adjusted. Respective usage examples in the place-and-shoot style and the handheld shoot style will be described below. However, the following usage examples are merely examples, and the image pickup unit of the present disclosure is not limited to the following shoot styles.

(Place-and-shoot Style)

Referring to FIGS. 14 to 17, usage examples (in the place-and-shoot style) of the image pickup unit 1 will be described below. FIG. 14 illustrates an appearance of the image pickup unit 1 in the position P1, and FIG. 15 illustrates an appearance of the image pickup unit 1 in the position P3B. Moreover, FIG. 16 illustrates an example of the place-and-shoot using the image pickup unit 1 in the position P1, and FIG. 17 illustrates an example of the place-and-shoot (back projection) using the image pickup unit 1 in the position P3B.

In the position P1 illustrated in FIG. 14, for example, as illustrated in FIG. 16, a user Y located at a distance from the image pickup unit 1 is allowed to be shot as a subject in a state in which the image pickup unit 1 is placed on a floor. This shoot style may be suitable, for example, for shooting of dance practice. It is to be noted that, when the image pickup unit 1 is placed (aligned with the subject), the user Y is allowed to easily adjust the position, the direction, and the like of the image pickup unit 1 (the camera body 10) while holding the gripping portion 20B of the grip 20 with his hand (refer to FIG. 7D). Moreover, in the place-and-shoot style (the position P1), projection mapping is allowed to be performed with use of the projector 21. Alternatively, as with the handheld shoot style (the position P2A), the projector 21 is allowed to also function as illumination.

In the position P3B illustrated in FIG. 15, for example, as illustrated in FIG. 17, as with the above-described example in FIG. 16, the user Y located at a distance from the image pickup unit 1 is allowed to be shot as the subject in a state in which the image pickup unit 1 is placed on, for example, a floor. However, in the position P3B, back projection is possible, and, for example, an image (a projection image I) may be projected on a wall surface W1 located at the back of the image pickup unit 1 while shooting is performed. It is to be noted that, in angle adjustment of the projector 21, the user Y is allowed to easily adjust the angle of the projector 21 by holding the gripping portion 20B of the grip 20 with his hand (refer to FIG. 7D) and rotating the grip 20 about the shaft A3. The projection position is allowed to be changed only by adjusting the angle of the grip 20 without moving the camera body 10 (without moving the entire image pickup unit 1).

Moreover, in this place-and-shoot style (the position P3B), for example, an image (an image of the user Y as a subject) picked up by the camera body 10 is allowed to be projected as the projection image I of the projector 21 on the wall surface W1 in real time. Therefore, for example, the user Y may practice dance while checking his body movement with use of the projection image. The image is allowed to be recorded, and so-called live view shooting is allowed to be performed in an indoor or outdoor location without a mirror or a monitor.

(Handheld Shoot Style)

Referring to FIGS. 18 to 22, usage examples (in the handheld shoot style) of the image pickup unit 1 will be described below. FIG. 18 illustrates an appearance of the image pickup unit 1 in the position P2A, and FIG. 19 illustrates an appearance of the image pickup unit 1 in the position P2B. Moreover, FIG. 20A illustrates an example of the handheld shoot (at a high angle) using the image pickup unit 1 in the position P2A, and FIG. 20C illustrates an example of the handheld shoot (at a low angle) using the image pickup unit 1 in the position P2B. FIG. 20B illustrates a state in the middle of a change from the high angle to the low angle.

In the position P2A illustrated in FIG. 18, for example, as illustrated in FIG. 20A, the user Y is allowed to perform high-angle shooting while holding the image pickup unit 1 (the camera body 10) with the hand (the right hand) Y1. At this time, the user Y inserts the hand Y1 into the opening section 20C from below, and so holds as to cover the gripping portion 20A and a part of the enclosure 10a of the camera body 10 with the palm of the hand Y1 (refer to FIGS. 7C and 20A). It is to be noted that a thumb of the hand Y1 is put on a part of an external surface of the grip 20 or a part of a back side surface of the camera body 10. Stable high-angle shooting is enabled by extending an arm (a right arm) Y2 upward in a state in which the image pickup unit 1 is held with the hand Y1 in such a manner. Moreover, during high-angle shooting, the projector 21 may be used as illumination.

Moreover, the user Y is allowed to change from this high-angle shooting to low-angle shooting without holding the image pickup unit 1 in another way (in a state in which the hand Y1 remains inserted in the opening section 20C of the grip 20). For example, the user Y extends the arm (the right arm) Y2 upward, and gradually lowers the arm Y2 (refer to FIG. 20B) from a state in which the grip 20 is held (refer to FIG. 20A). At this time, the grip 20 is allowed to be rotated (rotated about the shaft A2 in FIGS. 10A and 10B) by tilting a wrist downward without releasing the palm from the gripping portion 20A of the grip 20. Then, in a state in which the grip 20 has been rotated by 180 degrees, stable low-angle shooting is allowed to be performed (refer to FIG. 20C) by holding the gripping portion 20 with the hand Y1 and extending the arm Y2 downward. Thus, a change from high-angle shooting (the position P2A) to low-angle shooting (the position P2B) is allowed to be performed smoothly without releasing the hand Y1 from the grip 20.

In the position P2B illustrated in FIG. 19, for example, as illustrated in FIG. 20C, the user Y is allowed to perform low-angle shooting while holding the image pickup unit 1 (the camera body 10) with the hand (the right hand) Y1. When the low-angle shooting starts, the user Y may change from the high-angle shooting to the low-angle shooting, or the hand Y1 may be inserted into the grip 20 in the position P2B. In both cases, for example, the user Y may so hold the grip 20 as to hold the gripping portion 20A from above the grip 20 (refer to FIGS. 7C and 20A). It is to be noted that the thumb may be put on a part of the enclosure 10a of the camera body 10. Accordingly, stable low-angle shooting is allowed to be performed.

FIGS. 21 and 22 illustrate accessory mounting examples in the above-described handheld shoot style. In the handheld shoot style, an accessory (an accessory 110) configured to catch hold of an electronic apparatus (for example, a smartphone 12) having a display function is allowed to be mounted with use of the accessory screw hole 19. The accessory 110 has an adjustment mechanism 110a that is allowed to change an angle of the smartphone 120.

When the smartphone 120 is connected to the camera body 10 with use of the accessory 110 in such a manner, an image picked up by the camera body 10 is allowed to be displayed on, for example, a display surface 120a of the smartphone 120. Therefore, for example, during handheld shoot, the user Y is allowed to perform shooting while checking an image being shot on the display surface 120a of the smartphone 120.

At this time, as illustrated in FIG. 21, during high-angle shooting (in the position P2A), the smartphone 120 is supported by and fixed to the accessory 110 to allow the display surface 120a to face toward the back side of the image pickup unit 1. On the other hand, as illustrated in FIG. 22, during low-angle shooting (in the position P2B), the smartphone 120 is supported by and fixed to the accessory 110 to allow the display surface 120a of the smartphone 120 to face toward a top side of the image pickup unit 1. When the smartphone 120 is fixed to the accessory 110 in such a manner, the angle of the adjustment mechanism 110a is adjusted depending on a shoot angle to change the direction of the display surface 120a of the smartphone 120. Accordingly, the user easily sees an image displayed on the display surface 120a both during high-angle shooting and during low-angle shooting.

As described above, in the image pickup unit 1 of this embodiment, the grip 20 includes the projector 21; therefore, the user is allowed to adjust the position and the like of the projector 21 with use of the grip 20. Therefore, the image pickup unit 1 is capable of having an image projection function and easily adjusting the projection position.

Moreover, specifically in the handheld shoot style (the position P2A), the projector 21 is allowed to function as illumination for shooting.

Although the present disclosure is described referring to the embodiment, the present disclosure is not limited to the above-described embodiment and may be variously modified. For example, all of the shafts A1, A2, and A3 described in the above-described embodiment are not necessarily included, and the grip 20 may be so mounted on the camera body 10 as to be fixed to the camera body 10. However, as described above, since the grip is rotatable about the shafts A1, A2, and A3, variations in an angle enabling shooting and projection or angle change are increased. Therefore, it is desirable to include all of the shafts.

Moreover, the configuration described in the above-described embodiment is an example, and the present disclosure is not limited to the above-described configuration. For example, the position, the rotatable range (turnable range), the rotation direction, and the like of each of the shafts as rotation centers are not limited to the above-described examples, and may be variously modified. For example, a rotatable range (turnable range) about the first shaft is not limited to 90 degrees, and may be larger or smaller than 90 degrees. Moreover, the present disclosure is not limited to a case where the grip is rotated in the counterclockwise direction when viewed from the front, and the grip may be rotatable in a clockwise direction or both in the counterclockwise direction and the clockwise direction. Likewise, a rotatable range about the second shaft is not limited to 180 degrees, and may be larger or smaller than 180 degrees.

In addition, the shape of the enclosure, the kinds, number, layout, and the like of lenses in the camera body are not limited to the above-described examples. Furthermore, the kinds and layout of various buttons, keys, screw holes, and the like that are configured to perform operations of the camera body 10, the projector 21, and the like are also not limited to those described above. Moreover, it is not necessary to include all of them, and if necessary, some of them may be omitted, or a button or the like for another operation may be further provided.

Furthermore, in the above-described embodiment, the image pickup unit 1 for video shooting such as a video camera is exemplified; however, the image pickup unit of the present disclosure is applicable to image pickup units for still image shooting such as digital still cameras. Moreover, the effects described in the above-described embodiment and the like are merely examples, and may be other effects, or may further include any other effects.

It is to be noted that the present technology is allowed to have following configurations.

(1) An image pickup unit including:
a main body including a lens and an image pickup device; and
a grip mounted on the main body and including a projector.
(2) The image pickup unit according to (1), in which the grip is rotatable about a first shaft substantially parallel to an optical axis of the main body.
(3) The image pickup unit according to (2), in which the grip is further rotatable about a second shaft substantially orthogonal to the optical axis.
(4) The image pickup unit according to (3), in which the grip is further rotatable about a third shaft substantially orthogonal to each of the first shaft and the second shaft.
(5) The image pickup unit according to (4), in which the grip is rotated about the second shaft by about 180 degrees from a state in which the grip is located above an enclosure of the main body.

(6) The image pickup unit according to (5), in which the grip is rotated about the third shaft by a predetermined angle from a state in which the grip has been rotated about the second shaft by about 180 degrees.

(7) The image pickup unit according to any one of (1) to (6), in which the projector is mounted in the grip to face foreword in a state in which the grip has been rotated about the first shaft by 90 degrees from a state in which the grip is located above an enclosure of the main body.

(8) The image pickup unit according to (7), in which the projector functions as illumination when a subject is shot by the main body.

(9) The image pickup unit according to any one of (1) to (8), in which a zoom lens and a wide-angle lens are included in a front surface of the main body, and the zoom lens and the wide-angle lens are vertically arranged on a lower side and an upper side, respectively, when viewed from the front surface.

(10) The image pickup unit according to any one of (1) to (9), in which a part on a bottom surface side of an enclosure of the main body is beveled.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST 1 image pickup unit
10 camera body
10a enclosure
10b front surface section
10c connection section
11A zoom lens
11B wide-angle lens
12 power supply button
13L, 13R stereo microphone
14 plug slot
15 charge lamp
16 tripod screw hole
18a, 18b, 18c hinge
19 accessory screw hole
20 grip
20A, 20B gripping portion
20C opening section
21 projector
110 accessory
120 smartphone
P1, P2A, P2B, P3A, P3B position

The invention claimed is:

1. An image pickup unit, comprising:
a main body including a lens and an image pickup device; and
a grip mounted on the main body,
wherein the grip includes a projector,
wherein a state in which the grip is located above an enclosure of the main body is denoted as a first state,
wherein the grip is rotatable about a first shaft, wherein the first shaft is parallel to an optical axis of the main body,
wherein the grip is further rotatable about a second shaft, wherein the second shaft is orthogonal to the optical axis, and
wherein the grip is rotated about the second shaft by 180 degrees from the first state.

2. The image pickup unit according to claim 1, wherein the grip is further rotatable about a third shaft, wherein the third shaft is orthogonal to each of the first shaft and the second shaft.

3. The image pickup unit according to claim 2, wherein the grip is rotated about the third shaft by a set angle from a second state, wherein in the second state the grip is rotated about the second shaft by 180degrees.

4. The image pickup unit according to claim 1, wherein the projector is mounted in the grip to face foreword in a second state, wherein in the second state the grip has been rotated about the first shaft by 90 degrees from the first state.

5. The image pickup unit according to claim 4, wherein the projector is configured to function as illuminator when a subject is shot by the main body.

6. The image pickup unit according to claim 1, wherein a zoom lens and a wide-angle lens are included in a front surface of the main body, and
the zoom lens and the wide-angle lens are vertically arranged on a lower side and an upper side of the enclosure, when viewed from the front surface.

7. The image pickup unit according to claim 1, wherein a part on a bottom surface side of the enclosure of the main body is beveled.

* * * * *